United States Patent
Satake et al.

(10) Patent No.: US 12,044,808 B2
(45) Date of Patent: Jul. 23, 2024

(54) ULTRASONIC TRANSDUCER, ULTRASONIC SENSOR, OBJECT DETECTION APPARATUS, OBJECT DETECTION METHOD, AND OBJECT DETECTION PROGRAM

(71) Applicant: DENSO CORPORATION, Kariya (JP)

(72) Inventors: Masayoshi Satake, Nisshin (JP); Dai Kondou, Kariya (JP); Haruka Aoshima, Nisshin (JP); Kenji Fukabori, Kariya (JP); Kohei Kozuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 125 days.

(21) Appl. No.: 17/932,955

(22) Filed: Sep. 16, 2022

(65) Prior Publication Data
US 2023/0009960 A1  Jan. 12, 2023

Related U.S. Application Data

(63) Continuation of application No. PCT/JP2021/009313, filed on Mar. 9, 2021.

(30) Foreign Application Priority Data

Mar. 20, 2020 (JP) ................. 2020-050359

(51) Int. Cl.
*G01S 7/521* (2006.01)
*G01S 15/32* (2006.01)
*G01S 15/931* (2020.01)

(52) U.S. Cl.
CPC .............. *G01S 7/521* (2013.01); *G01S 15/32* (2013.01); *G01S 15/931* (2013.01); *G01S 2015/938* (2013.01); *G01S 2015/939* (2013.01)

(58) Field of Classification Search
CPC ...... G01S 15/872; G01S 15/32; G01S 15/931; G01S 7/521; G01S 2015/939;
(Continued)

(56) References Cited

U.S. PATENT DOCUMENTS

| 7,095,916 B2 * | 8/2006 | Hagood | G02B 6/366 |
| | | | 385/16 |
| 2005/0030840 A1 * | 2/2005 | Hagood | G02B 6/022 |
| | | | 369/44.14 |

(Continued)

FOREIGN PATENT DOCUMENTS

| JP | H10-070784 A | 3/1998 |
| JP | H11-237468 A | 8/1999 |

(Continued)

*Primary Examiner* — Daniel L Murphy
*Assistant Examiner* — Amie M Ndure
(74) *Attorney, Agent, or Firm* — MASCHOFF BRENNAN

(57) ABSTRACT

An ultrasonic transducer includes a transducer case and an ultrasonic element. The transducer case is formed into a bottomed, cylindrical shape having a side plate portion and a bottom plate portion that seals one end side of the side plate portion in an axial direction to configure a diaphragm. The ultrasonic element is fixedly supported to the bottom plate portion to face an interior space surrounded by the side plate portion and the bottom plate portion. The ultrasonic element is arranged in a position being offset in an in-plane direction orthogonal to the axial direction relative to a center position of the diaphragm in the in-plane direction to be capable of generating a first transmission wave having first directivity characteristics and a second transmission wave having second directivity characteristics that are directivity characteristics differing from the first directivity characteristics and in which sound pressure in the axial direction is decreased.

19 Claims, 19 Drawing Sheets

(58) Field of Classification Search
CPC ..... G01S 2015/938; H04R 17/00; H04R 3/00; H04R 1/32
USPC .......................................................... 367/99
See application file for complete search history.

(56) References Cited

U.S. PATENT DOCUMENTS

| | | | |
|---|---|---|---|
| 2009/0009306 A1* | 1/2009 | Magane | G01S 15/931 340/435 |
| 2010/0242611 A1* | 9/2010 | Terazawa | G01S 15/931 73/629 |
| 2016/0307726 A1* | 10/2016 | Hatakeyama | H01J 37/265 |
| 2018/0153508 A1* | 6/2018 | Kandori | B06B 1/0292 |

FOREIGN PATENT DOCUMENTS

| | | |
|---|---|---|
| JP | 2000-009825 A | 1/2000 |
| JP | 2000-152387 A | 5/2000 |
| JP | 2009-267472 A | 11/2009 |
| JP | 2010-278594 A | 12/2010 |
| JP | 2010-278913 A | 12/2010 |
| JP | 2016-139871 A | 8/2016 |
| WO | 2013/047544 A1 | 4/2013 |
| WO | 2016189812 A1 | 12/2016 |

* cited by examiner

ULTRASONIC TRANSDUCER, ULTRASONIC SENSOR, OBJECT DETECTION APPARATUS, OBJECT DETECTION METHOD, AND OBJECT DETECTION PROGRAM

CROSS-REFERENCE TO RELATED APPLICATION

The present application is a continuation application of International Application No. PCT/JP2021/009313, filed on Mar. 9, 2021, which claims priority to Japanese Patent Application No. 2020-050359, filed on Mar. 20, 2020. The contents of these applications are incorporated herein by reference in their entirety.

BACKGROUND

Technical Field

The present disclosure relates to an ultrasonic transducer, an ultrasonic sensor, an object detection apparatus, an object detection method, and an object detection program.

Related Art

An ultrasonic transmitter/receiver that includes two bottomed, cylindrical cases of differing sizes is known. In the ultrasonic transmitter/receiver, a bottom surface of the bottomed, cylindrical case that has a larger shape and an opening portion of the other bottomed, cylindrical case are fixed together, and a piezoelectric element is bonded to an outer portion of a bottom surface of the other bottomed, cylindrical case.

SUMMARY

One aspect of the present disclosure provides an ultrasonic transducer that includes a transducer case and an ultrasonic element. The transducer case is formed into a bottomed, cylindrical shape that has a side plate portion that is formed into a cylindrical shape that surrounds a center axis and a bottom plate portion that seals one end side of the side plate portion in an axial direction that is parallel to the center axis so as to configure a diaphragm that is capable of ultrasonic vibration. The ultrasonic element that is fixedly supported to the bottom plate portion so as to face an interior space that is surrounded by the side plate portion and the bottom plate portion, and converts between an electrical signal and ultrasonic vibrations. The ultrasonic element is arranged in a position that is offset in an in-plane direction that is orthogonal to the axial direction relative to a center position of the diaphragm in the in-plane direction so as to be capable of generating a first transmission wave that has first directivity characteristics and a second transmission wave that has second directivity characteristics that are directivity characteristics that differ from the first directivity characteristics and in which sound pressure in the axial direction is decreased.

DESCRIPTION OF THE EMBODIMENTS

Figure 1:
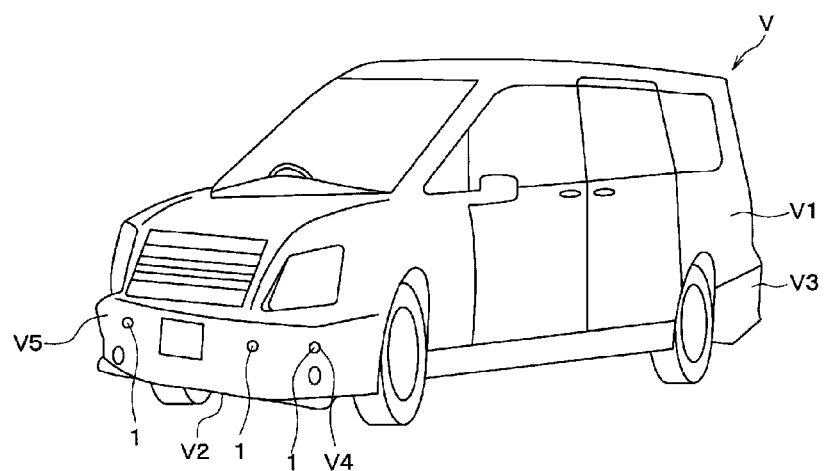
FIG. 1 is a perspective view of an outer appearance of a vehicle in which an ultrasonic sensor according to a first embodiment is mounted.

The following embodiments of the present disclosure relate to an ultrasonic transducer and an ultrasonic sensor that includes the ultrasonic transducer. In addition, the following embodiments relates to an object detection apparatus that detects an object using the ultrasonic transducer, an object detection method, and an object detection program that is implemented by the object detection apparatus.

An ultrasonic transmitter/receiver described in JP-A-2009-267472 includes two bottomed, cylindrical cases of differing sizes. Specifically, the ultrasonic transmitter/receiver has a configuration in which a bottom surface of the bottomed, cylindrical case that has a larger shape and an opening portion of the other bottomed, cylindrical case are fixed together, and a piezoelectric element is bonded to an outer portion of a bottom surface of the other bottomed, cylindrical case.

In this configuration, two differing resonance frequencies can be generated by a single ultrasonic transmitter/receiver. As a result, short-range and long-range detection can be performed by a single ultrasonic transmitter/receiver. Specifically, for example, to enable long-range detection, directivity characteristics are sharpened to eliminate erroneous detection caused by a ground or the like.

In the ultrasonic transmitter/receiver described in JP-A-2009-267472, the respective directivity characteristics at the two differing resonance frequencies both have a spindle shape in which maximum sound pressure is present on a center axis and that is axisymmetric with the center axis as a center. Differences in the directivity characteristics between the two differing resonance frequencies mainly appear as a difference in directivity angle, that is, a sound pressure half angle. Therefore, for example, differentiation between whether an object that is detected at a short range is a short protrusion, such as a wheel stop, that protrudes from the ground or a tall structure, such as a wall, that is present in front of the ultrasonic transmitter/receiver is difficult.

The following embodiments of the present disclosure have been achieved in light of issues given as examples above and the like. That is, for example, the following embodiments of the present disclosure may provide an ultrasonic transducer that is superior in object detection performance to conventional technology, and an ultrasonic sensor that includes the ultrasonic transducer. Alternatively, for example, the following embodiments of the present disclosure may provide an object detection apparatus that detects an object using the ultrasonic transducer, an object detection method, and an object detection program.

A first exemplary embodiment of the present disclosure provides an ultrasonic transducer that includes: a transducer case that is formed into a bottomed, cylindrical shape that has a side plate portion that is formed into a cylindrical shape that surrounds a center axis and a bottom plate portion that seals one end side of the side plate portion in an axial direction that is parallel to the center axis so as to configure a diaphragm that is capable of ultrasonic vibration; and an ultrasonic element that is fixedly supported to the bottom plate portion so as to face an interior space that is surrounded by the side plate portion and the bottom plate portion, and converts between an electrical signal and ultrasonic vibrations. The ultrasonic element is arranged in a position that is offset in an in-plane direction that is orthogonal to the axial direction relative to a center position of the diaphragm in the in-plane direction so as to be capable of generating a first transmission wave that has first directivity characteristics and a second transmission wave that has second directivity characteristics that are directivity characteristics that differ from the first directivity characteristics and in which sound pressure in the axial direction is decreased.

A second exemplary embodiment of the present disclosure provides an ultrasonic sensor that includes: the ultrasonic transducer; and a circuit control element that is electrically connected to the ultrasonic transducer so as to switch between the first vibration mode and the second vibration mode. The control circuit element generates the first transmission wave by driving the ultrasonic element that is provided in the center position and not driving the ultrasonic element that is provided in the position other than the center position, and generates the second transmission wave by not driving the ultrasonic element that is provided in the center position and driving the ultrasonic element that is provided in the position other than the center position.

A third exemplary embodiment of the present disclosure provides an ultrasonic sensor that includes: the ultrasonic transducer; and a control circuit element that is electrically connected to the ultrasonic transducer so as to switch between the first vibration mode and the second vibration mode. The control circuit element switches a drive timing of the pair of ultrasonic elements between in-phase and anti-phase (reversed phase or opposite phase).

A fourth exemplary embodiment of the present disclosure provides an object detection apparatus that is configured to detect an object that is present in a vicinity of a vehicle in which the ultrasonic transducer is mounted using the ultrasonic transducer. The object detection apparatus includes: an amplitude information acquiring unit that acquires amplitude information that corresponds to an amplitude of a reflected wave from the object of the transmission wave that is transmitted from the ultrasonic transducer; a distance measurement information acquiring unit that acquires distance measurement information that corresponds to a distance to the object based on the reflected wave; and a determining unit that determines a presence of an obstacle that is the object that is an obstacle to advancing of the vehicle based on at least one of the distance measurement information and the amplitude information that are acquired based on the reflected wave of the second transmission wave that is the transmission wave that has the second directivity characteristics that are symmetrical across the center axis in a vehicle height direction of the vehicle.

A fifth exemplary embodiment of the present disclosure provides an object detection method is a method for detecting an object that is present in a vicinity of a vehicle in which the ultrasonic transducer is mounted using the ultrasonic transducer. The object detection method includes following processes or steps of: acquiring amplitude information that corresponds to an amplitude of a reflected wave from the object of the transmission wave that is transmitted from the ultrasonic transducer; acquiring distance measurement information that corresponds to a distance to the object based on the reflected wave; and determining a presence of an obstacle that is the object that is an obstacle to advancing of the vehicle based on at least one of the distance measurement information and the amplitude information that are acquired based on the reflected wave of the second transmission wave that is the transmission wave that has the second directivity characteristics that are symmetrical across the center axis in a vehicle height direction of the vehicle.

A sixth exemplary embodiment of the present disclosure provides a non-transitory computer-readable storage medium storing therein an object detection program that is a program that includes processes implemented by an object detection apparatus configured to detect an object that is present in a vicinity of a vehicle in which the ultrasonic transducer is mounted using the ultrasonic transducer. The processes implemented by the object detection apparatus include: a process for acquiring amplitude information that corresponds to an amplitude of a reflected wave from the object of the transmission wave that is transmitted from the ultrasonic transducer; a process for acquiring distance measurement information that corresponds to a distance to the object based on the reflected wave; and a process for determining a presence of an obstacle that is the object that is an obstacle to advancing of the vehicle based on at least one of the distance measurement information and the amplitude information that are acquired based on the reflected wave of the second transmission wave that is the transmission wave that has the second directivity characteristics that are symmetrical across the center axis in a vehicle height direction of the vehicle.

Here, in each section of the application documents, elements may be given reference numbers that are in parentheses. However, these reference numbers merely indicate examples of corresponding relationships between the elements and specific means described according to the embodiment described hereafter. Therefore, the present disclosure is not limited in any way by the above-described reference numbers.

EMBODIMENTS

Embodiments of the present disclosure will hereinafter be described with reference to the drawings. Here, regarding various modifications that are applicable to an embodiment, understanding of the embodiment may be hindered if the modifications are inserted in the middle of a series of descriptions related to the embodiment. Therefore, rather than the modifications being inserted in the middle of a series of descriptions related to the embodiment, the modifications are collectively described following the descriptions.

First Embodiment: Sensor Configuration

With reference to FIG. 1, a vehicle V is a so-called four-wheeled automobile and includes a box-shaped vehicle body V1. A front bumper V2 that is a vehicle body component is mounted in a front end portion of the vehicle body V1. A rear bumper V3 that is a vehicle body component is mounted in a rear end portion of the vehicle body V1.

Figure 2:
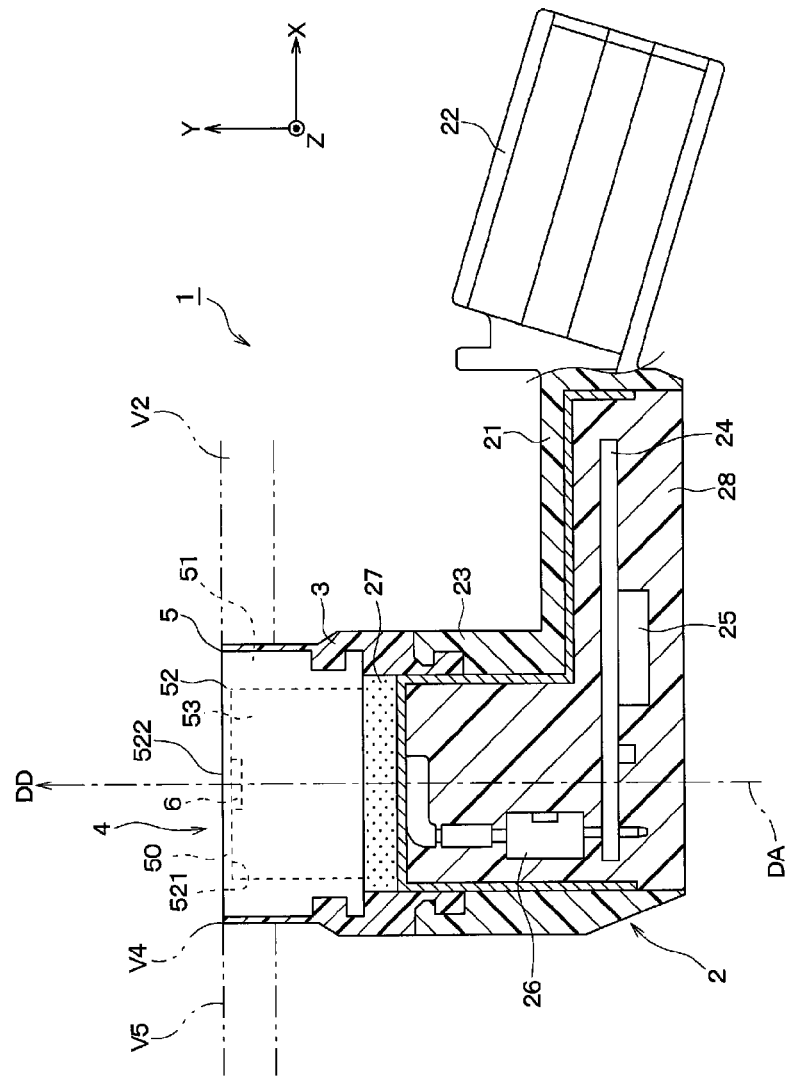
FIG. 2 is a cross-sectional view of an overall apparatus configuration of the ultrasonic sensor shown in FIG. 1.

An ultrasonic sensor 1 is a so-called onboard clearance sonar and is mounted in the front bumper V2 and the rear bumper V3. A mounting hole V4 that is a through hole for mounting the ultrasonic sensor 1 is provided in the front bumper V2 and the rear bumper V3. The mounting hole V4 that is provided in the front bumper V2 is formed on a bumper outer surface V5 so as to open outside the front bumper V2, that is, frontward. Hereafter, a state in which the ultrasonic sensor 1 is mounted to the vehicle V, that is, a state in which the ultrasonic sensor 1 is mounted in the front bumper V2 or the rear bumper V3 is referred to as an "onboard state." In addition, the vehicle V in which the ultrasonic sensor 1 is mounted may be referred to as an "own vehicle." (Ultrasonic sensor) FIG. 2 shows an overall configuration of the ultrasonic sensor 1 in the onboard state of being mounted in the front bumper V2. For convenience of description, a right-handed XYZ orthogonal coordinate system is set as shown in the drawing such that a Y axis is parallel to a center axis DA and a Z axis is parallel to a vehicle height direction in the onboard state. The center axis DA is a virtual straight line that extends along a transmission/reception direction of ultrasonic waves in the ultrasonic sensor 1. A direction that is parallel to the center axis DA is referred to as an "axial direction." The vehicle height direction is a direction that is parallel to a direction of gravitational action in a state in which the own vehicle is stably placed on a horizontal plane. In addition, an upper side in FIG. 2, that is, a Y-axis positive direction side may be referred to as a "tip end side" in the axial direction. In a similar manner, a lower side in FIG. 2, that is, a Y-axis negative direction side may be referred to as a "base end side" in the axial direction. Furthermore, an arbitrary direction that is orthogonal to the axial direction may be referred to as an "in-plane direction." That is, the "in-plane direction" is a direction that is parallel to an XZ plane.

With reference to FIG. 2, according to the present embodiment, the ultrasonic sensor 1 is mounted to the own vehicle such that the center axis DA is horizontal. The ultrasonic sensor 1 includes a sensor case 2, an elastic holding member 3, and an ultrasonic transducer 4. The ultrasonic transducer 2 includes a transducer case 5 and an ultrasonic element 6. Hereafter, configurations of sections that configure the ultrasonic sensor 1 will be described.

The sensor case 2 that configures a casing of the ultrasonic sensor 1 is integrally formed by a hard synthetic resin, such as polypropylene. The sensor case 2 has a case main-body portion 21, a connector portion 22, and a case cylindrical portion 23.

The case main-body portion 21 is formed into a box shape that is open on the base end side in the axial direction. The connector unit 22 is provided to electrically connect the ultrasonic sensor 1 to an ECU. ECU is an abbreviation of Electronic Control Unit. The connector unit 22 is provided so as to extend from a side wall portion of the case main-body portion 21 towards an outer side away from the center axis DA.

The case cylinder portion 23 that is a circular cylindrical portion of the sensor case 2 that surrounds the center axis DA protrudes towards the tip end side in the axial direction from the case main-body portion 21. The case cylinder portion 23 is configured to hold the base end portion in the axial direction of the elastic holding member 3. A cylindrical space inside the case cylinder portion 23 is provided so as to communicate with a space inside the case main body portion 21. Inside the sensor case 2, a circuit board 24, a control circuit element 25, a wiring portion 26, a damper member 27, and a case filling material 28 are arranged.

The circuit board 24 is housed in the case main-body portion 21. The control circuit element 25 that controls operation of the ultrasonic sensor 1 is mounted on the circuit board 24. The control circuit element 25 is a so-called integrated circuit element and is configured to control transmission/reception operation of the ultrasonic transducer 4. The wiring portion 26 is provided to electrically connect the ultrasonic transducer 4 and the circuit board 24. That is, the control circuit element 25 is electrically connected to the ultrasonic transducer 4 by a circuit (not shown) that is provided on the circuit board 24 and the wiring portion 26.

The damper member 27 is provided to suppress vibration transmission from the ultrasonic transducer 4 to the sensor case 2. Specifically, the damper member 27 is formed by a foamed elastic body, such as foamed silicone, that has insulating properties and elasticity. The damper member 27 is formed into a circular disk shape that has an outer diameter that corresponds to an inner diameter of the elastic holding member 3. The damper member 27 is fitted into a cylindrical space inside the elastic holding member 3, further towards the base end side than the ultrasonic transducer 4 in the axial direction.

The space inside the sensor case 2 is filled with the case filling material 28. The case filling material 28 is formed by a synthetic resin material that has insulating properties, such as silicone rubber.

The elastic holding member 3 is formed into a circular cylindrical shape of which the center axis DA is an axial center. The elastic holding member 3 is held in a tip end portion in the axial direction of the case cylinder portion 23 that is provided in the sensor case 2. The elastic holding member 3 is formed by a synthetic resin-based elastic material, such as silicone rubber, that has insulating properties and elasticity.

The elastic holding member 3 is configured to support the ultrasonic transducer 4 in a state in which a base end side in the axial direction of the ultrasonic transducer 4 is covered while a tip end surface is exposed. That is, the ultrasonic transducer 4 is elastically supported by the sensor case 2, by the elastic holding member 3.

(Ultrasonic Transducer)

The ultrasonic transducer 4 provides a function as an integrated transmission/reception-type ultrasonic microphone. That is, the ultrasonic transducer 4 is configured to be capable of transmitting and receiving ultrasonic waves. Specifically, the ultrasonic transducer 4 is configured to transmit a transmission wave that is an ultrasonic wave. In addition, the ultrasonic transducer 4 is configured to receive a reflected wave of the transmission wave from an object that is present in a vicinity of the own vehicle, and generate a signal that corresponds to a strength and a frequency of the received reflected wave.

First Configuration Example

Figure 3:
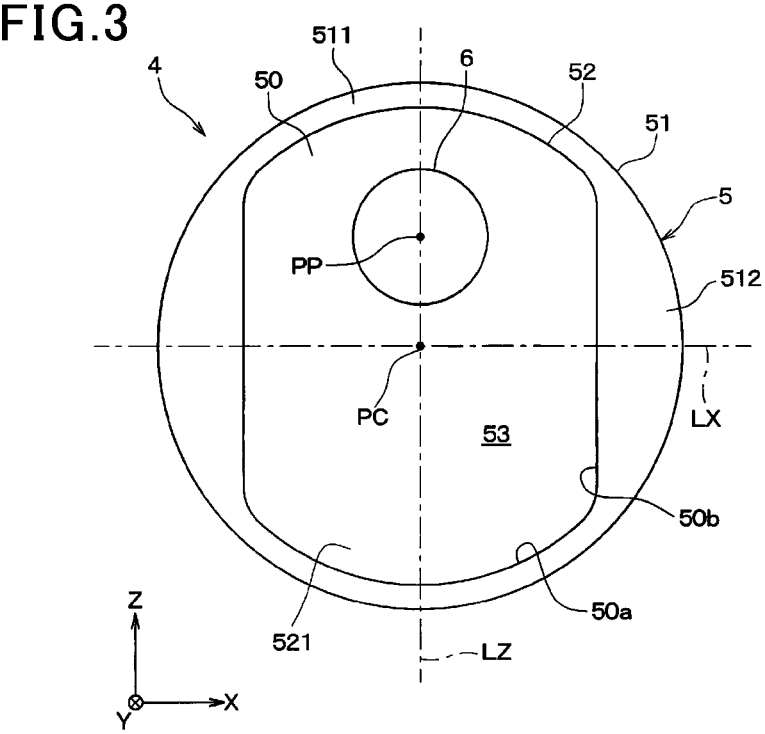
FIG. 3 is a bottom view of a first configuration example of an ultrasonic transducer shown in FIG. 2.

With reference to FIG. 2 and FIG. 3, details of a configuration of the ultrasonic transducer 4 according to the present embodiment will be described below. Here, a right-handed XYZ orthogonal coordinate system shown in FIG. 3 is identical to the right-handed XYZ orthogonal coordinate system shown in FIG. 2.

The transducer case 5 is formed into a bottomed, cylindrical shape that surrounds the center axis DA. According to the present embodiment, the transducer case 5 has a circular columnar outer shape with the center axis DA as an axial center. In addition, the transducer case 5 is seamlessly integrally formed by a metal, such as aluminum.

The transducer case 5 has a diaphragm 50 that is capable of ultrasonic vibration. The diaphragm 50 is a thin-plate portion that has a thickness direction that is parallel to the axial direction in the transducer case 5. The diaphragm 50 is provided so as to vibrate at a predetermined frequency within an ultrasonic band, while flexibly deforming, with an outer edge portion as a fixed end, that is, a nodal position.

According to the present embodiment, the diaphragm 50 is formed into a plate shape that has a fixed thickness. In addition, as shown in FIG. 3, the diaphragm 50 is formed into an oval shape that has a long direction and a short direction that are orthogonal to each other. Specifically, the diaphragm 50 is formed into a rounded-corner rectangular shape or an elliptical shape in which the Z-axis direction is the long direction and the X-axis direction is the short direction. As a result, the ultrasonic transducer 4 is configured to have a directivity angle that is narrower in the Z-axis direction than the X-axis direction. The long direction of the oval shape of the diaphragm 50 is simply referred to, hereafter, as the "long direction." This similarly applies to the "short direction," as well.

That is, the diaphragm 50 is formed by an area that is surrounded by a pair of circular arc portions 50a and a pair of chord portions 50b. The circular arc portions 50a are provided on both end portions of the diaphragm 50 in the long direction so as to be open towards the center axis DA. The chord portions 50b extend in the long direction in both end portions of the diaphragm 50 in the short direction, so as to connect the opposing end portions of the pair of circular arc portions 50a.

The transducer case 5 has a side plate portion 51 and a bottom plate portion 52. The side plate portion 51 is formed into a cylindrical shape that surrounds the center axis DA. The bottom plate portion 52 that configures the diaphragm 50 is provided so as to seal one end side, that is, the tip end side in the axial direction of the side plate portion 51. The bottom plate portion 52 is seamlessly integrally coupled with a tip end portion in the axial direction of the side plate portion 51. An interior space 53 that is surrounded by the side plate portion 51 and the bottom plate portion 52 is provided so as to open towards the base end side in the axial direction.

The side plate portion 51 has a thin portion 511 and a thick portion 512. The thin portion 511 is formed into a partially cylindrical shape that has a predetermined thickness in a radial direction that is orthogonal to the center axis DA. The "radial direction" is a direction that radially extends from the center axis DA. That is, the radial direction is a radius direction of a virtual circle, when the virtual circle is drawn on a plane of which the center axis DA is a normal such that an intersection between the plane and the center axis DA is a center.

The thin portion 511 is provided in both end portions in the long direction of the oval-shaped diaphragm 50, that is, positions that correspond to the circular arc portions 50a in a circumferential direction. The "circumferential direction" is a circumferential direction of the above-described virtual circle. The pair of thin portions 511 are arranged so as to oppose each other with the center axis DA therebetween.

The thick portion 512 is formed to be thicker than the thin portion 511 in the radial direction. The thick portion 512 is provided in both end portions in the short direction of the oval-shaped diaphragm 50, that is, positions that correspond to the chord portions 50b in the circumferential direction. The pair of thick portions 512 are arranged so as to oppose each other with the center axis DA therebetween. The thick portion 512 is formed into a bow shape, from a cross-sectional view at a cross-section that is orthogonal to the center axis DA.

An inner surface 521 that is a surface of the bottom plate portion 52 that faces the interior space 53 is a surface that configures a bottom surface of the diaphragm 50, and is formed into an oval shape that is a shape identical to the diaphragm 50. An outer surface 522 of the bottom plate portion 52, that is, the diaphragm 50 that is a back surface of the inner surface 521, that is, a surface on a side opposite the inner surface 521 is provided so as to be exposed towards an exposure direction DD. The exposure direction DD is parallel to the axial direction and is a direction from the inner surface 521 towards the outer surface 522. A protective film (not shown) such as a coating film of a same color as a bumper outer surface V5 is formed on the outer surface 522. A tip end surface in the axial direction of the ultrasonic transducer 4 is formed by an outer surface of the protective film on a side opposite a joining surface to the outer surface 522.

The transducer case 5 is configured to hold the ultrasonic element 6 in the interior space 53 that is surrounded by the side plate portion 51 and the bottom plate portion 52. That is, the ultrasonic element 6 is fixedly supported to the bottom plate portion 52 so as to face the interior space 53. Specifically, the ultrasonic element 6 is fixed to the diaphragm 50 on the inner surface 521 side.

The ultrasonic element 6 is configured to convert between an electrical signal and ultrasonic vibrations. Specifically, the ultrasonic element 6 is a piezoelectric element and is formed into a thin film-like shape that has a thickness in the axial direction.

According to the present embodiment, only a single ultrasonic element 6 is provided in the diaphragm 50. In addition, the ultrasonic element 6 is arranged in a position that is offset in the in-plane direction, that is, the radial direction from a center position PC of the diaphragm 50 in the in-plane direction. The center position PC is a position of an intersection between the center axis DA and the inner surface 521.

A planar shape of the ultrasonic element 6 when viewed from a line of sight that is parallel to the Y axis is formed into a circular shape. The ultrasonic element 6 is provided such that an element center PP is shifted vertically upward, that is, towards the Z-axis positive direction side from the center position PC, in the onboard state. The element center PP is a center of an outer shape of the ultrasonic element 6 in the in-plane direction. Specifically, when the planar shape of the ultrasonic element 6 is a circular shape or an elliptical shape, the element center PP is the center of the circular shape or the elliptical shape.

The ultrasonic transducer 4 according to the present embodiment is configured to be capable of generating a first transmission wave that has first directivity characteristics and a second transmission wave that has second directivity characteristics as a result of the ultrasonic element 6 being provided as described above. The first directivity characteristics are directivity characteristics that have a spindle shape such that maximum sound pressure is present on the center axis DA (that is, directivity characteristics shown by a broken line in FIG. 7). The first directivity characteristics can also be referred to as ordinary directivity characteristics. The second directivity characteristics are directivity characteristics that differ from the first directivity characteristics. The second directivity characteristics are directivity characteristics in which sound pressure in the axial direction is decreased (that is, directivity characteristics shown by a solid line in FIG. 7). That is, the second directivity characteristics are directivity characteristics that have a "heart" shape (cardioid) in which the sound pressure on the center axis AD in the directivity characteristics that have a spindle shape, such as the first directivity characteristics, is significantly decreased, while symmetry across the center axis DA in the Z-axis direction is maintained. Here, the "symmetry" across the center axis DA in the Z-axis direction of the second directivity characteristics does not require complete symmetry in terms of numeric values, and allows differences to an extent that the second directivity characteristics can be referred to as being "essentially symmetrical" or "substantially symmetrical."

The center position PC is an anti-nodal position in a first vibration mode of the diaphragm 50 that corresponds to the first directivity characteristics, and is a nodal position in a second vibration mode of the diaphragm 50 that corresponds to the second directivity characteristics. According to the present embodiment, the ultrasonic element 6 is provided in a position that differs from the center position PC. That is, the ultrasonic element 6 is arranged in a position that does not overlap the center position PC in the in-plane direction. In other words, when viewed from a line of sight that is parallel to the Y axis, that is, when the ultrasonic element 6 and the center position PC are projected onto the XZ plane, the center position PC is provided on an outer side of the outer shape of the ultrasonic element 6. Alternatively, the ultrasonic element 6 is arranged between the center position PC and the thin portion 511 on a vertical line LZ. The vertical line LZ is a line of intersection between a plane that includes the center axis DA and is parallel to a YZ plane, and a plane that includes the inner surface 521 and is parallel to the XZ plane. In contrast, a line of intersection between a plane that includes the center axis AD and is parallel to an XY plane, and a plane that includes the inner surface 521 and is parallel to the XZ plane is referred to as a horizontal line LX.

According to the present embodiment, the ultrasonic element 6 is arranged in the anti-nodal position in the second vibration mode. Specifically, the ultrasonic element 6 is provided such that a position in the in-plane direction of the element center PP coincides with the anti-nodal position in the second vibration mode.

Second Configuration Example

Figure 4:
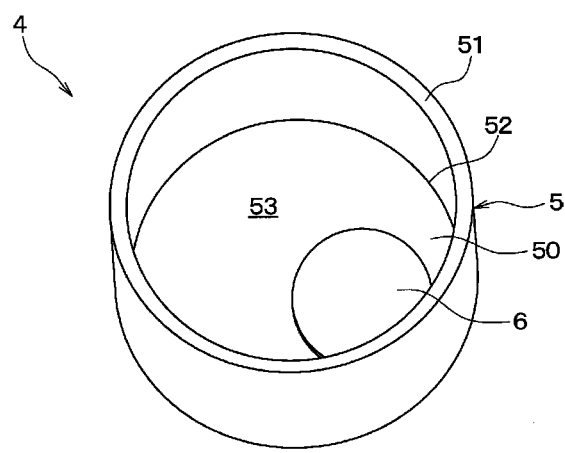
FIG. 4 is a perspective view of a second configuration example of the ultrasonic transducer shown in FIG. 2.

The ultrasonic transducer 4 shown in FIG. 4 is that in which the shape of the transducer case 5 is modified from that in the above-described configuration. That is, in the ultrasonic transducer 4 shown in FIG. 4, the side plate portion 51 of the transducer case 5 is formed into a circular cylindrical shape that has an even thickness and surrounds the center axis DA. In other words, a configuration shown in FIG. 4 corresponds to the configuration in FIG. 3 in which the thick portion 512 is changed to the thin portion 511.
(Effects)

Hereafter, an overview of operations of the configuration according to the present embodiment will be described with reference to the drawings, together with effects that are achieved by this same configuration.

In the ultrasonic sensor 1 that has the above-described configuration, when the ultrasonic element 6 that is housed inside the bottomed, cylindrical transducer case 5 is driven, the ultrasonic element 6 ultrasonically vibrates. As a result of the ultrasonic vibration of the ultrasonic element 6, the transducer case 5 is excited. Then, the ultrasonic transducer 4 that is configured by the transducer case 5 and the ultrasonic element 6 vibrates in a predetermined vibration mode. As a result, the transmission wave is transmitted from the diaphragm 50 along the exposure direction DD.

Figure 5A:
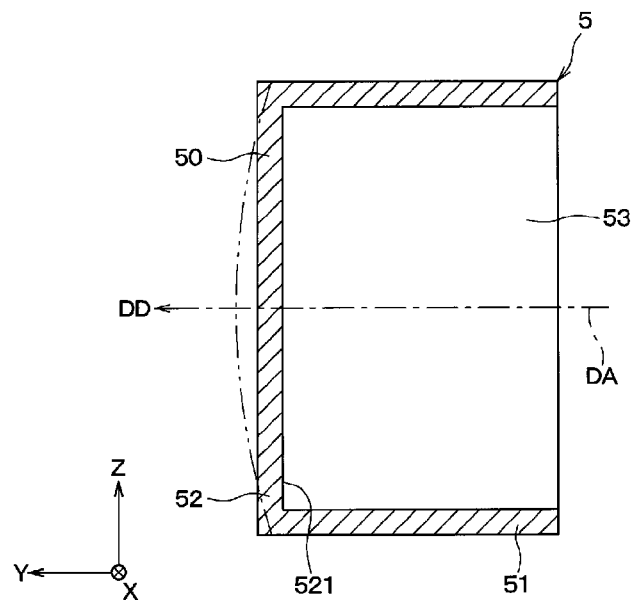
FIG. 5A is a cross-sectional view of a first vibration mode of a diaphragm provided in a transducer case shown in FIG. 4.
Figure 5B:
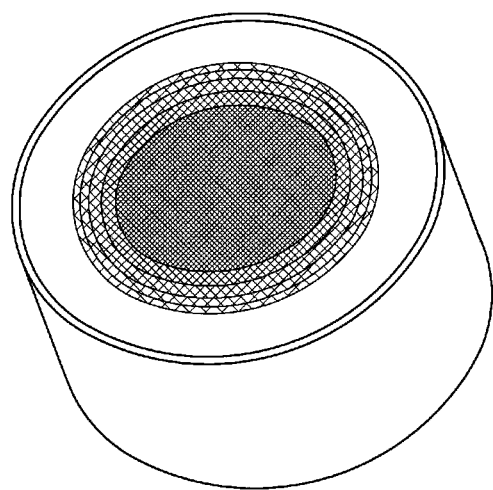
FIG. 5B is a perspective view of the first vibration mode of the diaphragm provided in the transducer case shown in FIG. 4.
Figure 6A:
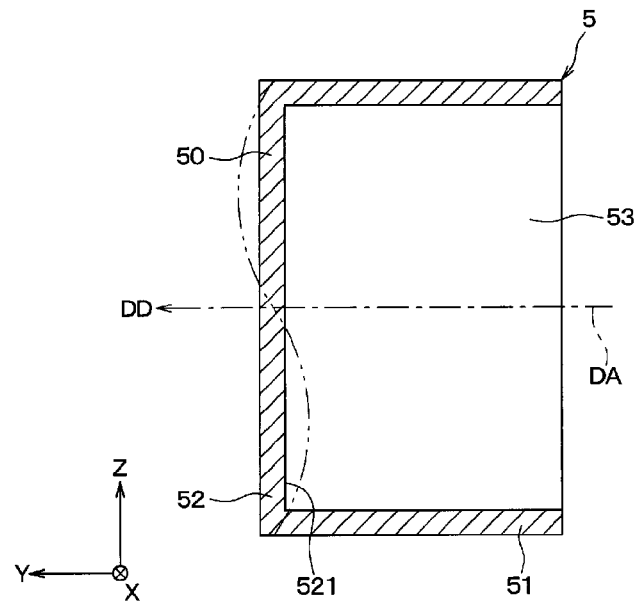
FIG. 6A is a cross-sectional view of a second vibration mode of the diaphragm provided in the transducer case shown in FIG. 4.
Figure 6B:
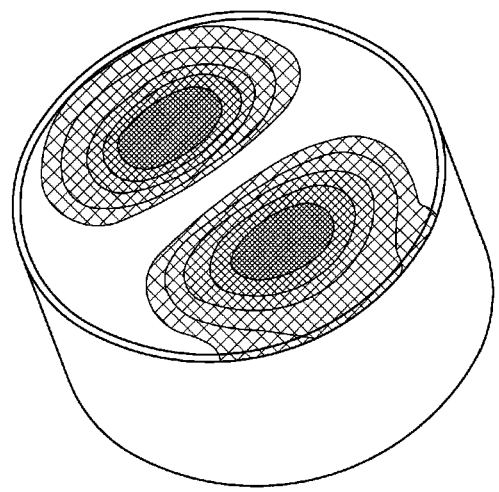
FIG. 6B is a perspective view of the second vibration mode of the diaphragm provided in the transducer case shown in FIG. 4.

Hereafter, to simplify the description, the directivity characteristics of the ultrasonic transducer 4 will be described using vibration modes of the transducer case 5 shown in FIG. 4. FIG. 5A and FIG. 5B show a first vibration mode at a resonance frequency f1. FIG. 6A and FIG. 6B show a second vibration mode at a resonance frequency f2. f1<f2. A two-dot chain line in FIG. 5A and FIG. 6A shows a manner of vibration of the diaphragm 50. FIG. 5B and FIG. 5B show an amplitude distribution of the diaphragm 50 by cross-hatching density.

A structure of the transducer case 5 shown in FIG. 3 and FIG. 4 enables the first vibration mode and the second vibration mode to be generated. Switching between the first vibration mode at the resonance frequency f1 and the second vibration mode at the resonance frequency f2 is performed by switching of a drive frequency of the ultrasonic element 6 in the control circuit element 25. The "drive frequency" is a frequency of an element drive voltage that is an alternating-current voltage that is applied to the ultrasonic element 6.

As shown in FIG. 5A and FIG. 5B, the first vibration mode is a vibration mode in which the overall diaphragm 50 is flexibly deformed in a same direction along the Y axis. In the first vibration mode, the nodal position is an outer edge portion in the radial direction of the diaphragm 50 and the anti-nodal position is the center position PC.

As shown in FIG. 6A and FIG. 6B, the second vibration mode is a vibration mode in which, while one side of the diaphragm 50 that is further towards the Z-axis direction than the horizontal line LX is flexibly deformed towards the Y-axis positive direction side, another side is flexibly deformed towards the Y-axis negative direction side. A magnitude of amplitude is substantially symmetrical across the horizontal line LX, between the one side and the other side. In the second vibration mode, the nodal position is formed on the horizontal line LX that includes the center position PC and the outer edge portion in the radial direction of the diaphragm 50. The anti-nodal position is formed in two sections on the vertical line LZ in an intermediate position between the center position PC and the side plate portion 51.

The diaphragm 50 is favorably excited by the ultrasonic element 6 being provided in or near the anti-nodal position in the vibration mode. Meanwhile, when the ultrasonic element 6 is provided in or near the nodal position in the vibration mode, the diaphragm 50 is difficult to favorably excite to an extent that the transmission wave can be transmitted.

In this regard, the in-plane position of the ultrasonic element 6 in the diaphragm 50 that enables the first transmission wave in the first vibration mode to be favorably transmitted is present over a wide area that is centered on the center position PC that is the anti-nodal position. Specifically, for example, as shown in FIG. 3 and FIG. 4, a radial direction dimension of the ultrasonic element 6 may be about ½ to ¼ of the radial direction dimension of the diaphragm 50. In this case, the first vibration mode can be favorably generated regardless of the in-plane position of the ultrasonic element 6 if the ultrasonic element 6 simply is arranged within an area of the diaphragm in the in-plane direction.

In contrast, the second vibration mode can hardly be generated by the ultrasonic sensor 6 being provided in the center position PC that is the nodal position. In this regard, if the element center PP of the ultrasonic element 6 is offset from the center position PC, a degree of generation of the second vibration mode increases based on an amount of offset. As a result of the ultrasonic element 6 being provided in a position that differs from the center position PC, that is, a position that does not overlap the center position PC in the in-plane direction, the second transmission wave in the second vibration mode can be transmitted at a favorable strength to an extent that a reflected wave from an object outside can be received. In particular, as a result of the ultrasonic element 6 being provided such that the position in the in-plane direction of the element center PP coincides with the anti-nodal position in the second vibration mode, excitation efficiency of the second vibration mode is increased.

Figure 7:
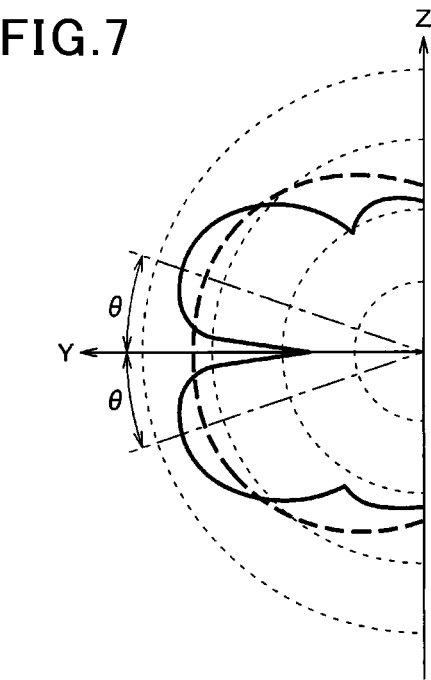
FIG. 7 is a diagram illustrating directivity characteristics of the ultrasonic transducers shown in FIG. 3 and FIG. 4.

FIG. 7 shows the directivity characteristics along the vertical line LZ. In FIG. 7, the broken line shows the directivity characteristics of the first transmission wave and the solid line shows the directivity characteristics of the second transmission wave. As shown in FIG. 7, the first transmission wave is radially propagated while having a predetermined directivity, that is, directivity angle from the center of the diaphragm 50. Therefore, the first transmission wave has the spindle-shaped directivity characteristics such that the maximum sound pressure is present in the Y-axis positive direction, that is, the exposure direction DD that is the front of the ultrasonic transducer 4. That is, the first transmission wave can be said to be substantially non-directional in terms of the directivity characteristics along the vertical line LZ.

Therefore, a reflected wave of the first transmission wave can be received from any of a tall structure, a short protrusion, and a ceiling protrusion. The tall structure is a structure that is relatively tall, such as a wall, that is present in front of the ultrasonic transducer 4, that is, in front of the own vehicle. The short protrusion is a protrusion that is relatively short, such as a wheel stop, that protrudes upward from the ground. The ceiling protrusion is a beam, a shutter gate, or the like that protrudes downward from a ceiling.

In contrast, unlike the first directivity characteristics of the first transmission wave, the second directivity characteristics of the second transmission wave is such that the sound pressure in the axial direction is decreased. Specifically, in the second transmission wave, the sound pressure in the exposure direction DD is significantly decreased, and the maximum sound pressure is present in a direction that forms an elevation angle θ in an up/down direction relative to the exposure direction DD. The angle θ is determined by the in-plane position of the ultrasonic element 6 in the diaphragm 50, an in-plane shape of the ultrasonic element 6, and the like. For example, the angle θ can be set to about 5 to 15 degrees.

That is, as the directivity characteristics along the vertical line LZ, the second transmission wave has a "heart" shape (cardioid) in which the sound pressure on the center axis DA is significantly decreased while symmetry across the center axis DA is maintained. Unlike the first transmission wave, the second transmission wave is such that the sound pressure in the axial direction does not reach a predetermined sound pressure that is to an extent that a reflected wave from an object can be favorably received. In other words, the second directivity characteristics of the second transmission wave is such that the sound pressure in the axial direction is decreased from that of the first directivity characteristics of the first transmission wave. Therefore, while a reflected wave from an object of the second transmission wave is hardly received from the exposure direction DD that is in front of the ultrasonic transducer 4, the reflected wave can be favorably received from a direction that forms the angle θ with the exposure direction DD.

Here, the ultrasonic sensor 1, that is, the ultrasonic transducer 4 is mounted to the own vehicle such that the directivity characteristics of the second transmission wave are symmetrical across the center axis DA in the vehicle height direction. Therefore, the reflected wave of the second transmission wave can be received from the short protrusion and the ceiling protrusion, without being received from the tall structure. However, the ceiling protrusion is rarely an obstacle to advancing of the own vehicle. Even if the ceiling protrusion is an obstacle, the ceiling protrusion is visually apparent.

In this manner, a detection area, that is, a presence area of reflection points of an object from which the reflected wave can be received differs between the first transmission wave and the second transmission wave of which the directivity characteristics significantly differ from each other. Specifically, according to the present embodiment, an elevation angle range of the reflection points differs between the first transmission wave and the second transmission wave. Therefore, as a result of switching between the first transmission wave and the second transmission wave being performed by the drive frequency being changed, differentiation between whether an object that is detected at a short range is a short protrusion or a tall structure is facilitated.

In this regard, according to the present embodiment, switching between the first transmission wave and the second transmission wave of which the directivity characteristics significantly differ from each other in this manner can be easily performed by switching of a transmission frequency, that is, the drive frequency. In addition, the ultrasonic transducer 4 that enables such switching between the first transmission wave and the second transmission wave can be actualized through minimal specification modification from a conventional configuration, that is, through the ultrasonic element 6 being arranged so as to be offset in the in-plane direction relative to the center position PC. Consequently, in providing the ultrasonic transducer 4 that is superior in object detection performance to conventional technology and the ultrasonic sensor 1 that includes the ultrasonic transducer 4, increase in manufacturing cost can be minimized and favorable durability can be ensured. Furthermore, as a result of the ultrasonic element 6 being arranged in a position that differs from the center position PC in the in-plane direction, a significant difference in directivity characteristics (that is, a difference in detection areas) can be provided between the first transmission wave and the second transmission wave.

The ultrasonic sensor 1 according to the present embodiment includes the above-described ultrasonic transducer 4 and the control circuit element 25 that is electrically connected to the ultrasonic transducer 4 so as to switch between the first vibration mode and the second vibration mode. Therefore, according to the present embodiment, the ultrasonic transducer 4 that is even more superior in object detection performance than that in the past and the ultrasonic sensor 1 that includes the ultrasonic transducer 4 can be provided.

In contrast, in configurations described in JP-A-2009-267472 and JP-A-2010-278913, while transmission/reception can be performed at two differing resonance frequencies, the difference between respective directivity characteristics is small. Therefore, a significant difference in detection areas such as that according to the present embodiment cannot be achieved between the two differing resonance frequencies in these conventional configurations.

Third Configuration Example

Figure 8:
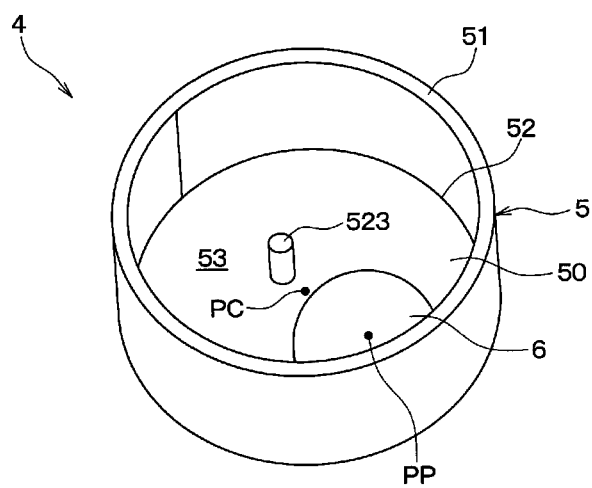
FIG. 8 is a perspective view of a third configuration example of the ultrasonic transducer shown in FIG. 2.

FIG. 8 is that in which a portion of the configuration of the transducer case 5 in the ultrasonic transducer 4 shown in FIG. 3 and FIG. 4 is modified. In the description of the configuration example below, sections that differ from those in the above-described first and second configuration examples are mainly described. In addition, sections in the above-described first and second configuration examples and the configuration example described hereafter that are identical or equivalent to each other are given the same reference numbers. Therefore, in the description of the configuration example below, the descriptions in the above-described first and second configuration examples may be applied as appropriate regarding constituent elements that have the same reference numbers as those in the above-described first and second configuration examples, unless technical inconsistencies or special additional descriptions are present.

The transducer case 5 shown in FIG. 8 has a protruding portion 523. The protruding portion 523 is provided in the bottom plate portion 52 so as to protrude towards the interior space 53 side. The protruding portion 523 can be arranged on a straight line that connects the center position PC and the element center PP. As a result of this configuration, generation of the second vibration mode can be favorably promoted. A quantity of the protruding portions 523 is one or more.

Here, an in-plane position, a shape, and the quantity of the protruding portion 523 can be set as appropriate based on at least one of the resonance frequency f2 and a difference between the resonance frequency f1 and the resonance frequency f2. In addition, the protruding portion 523 is preferably arranged on the straight line that passes through the center position PC and the element center PP. Consequently, a favorable vibration state in the second vibration mode such as that shown in FIG. 6B can be actualized.

Fourth Configuration Example

Figure 9:
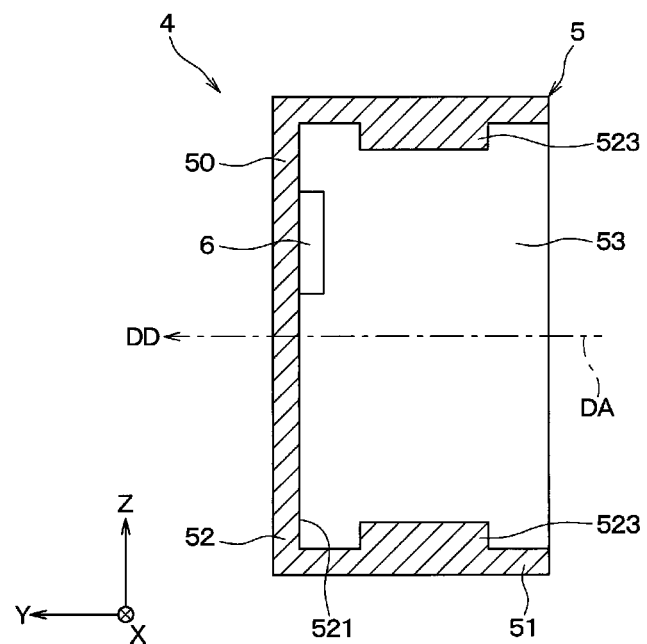
FIG. 9 is a cross-sectional view of a fourth configuration example of the ultrasonic transducer shown in FIG. 2.
Figure 10:
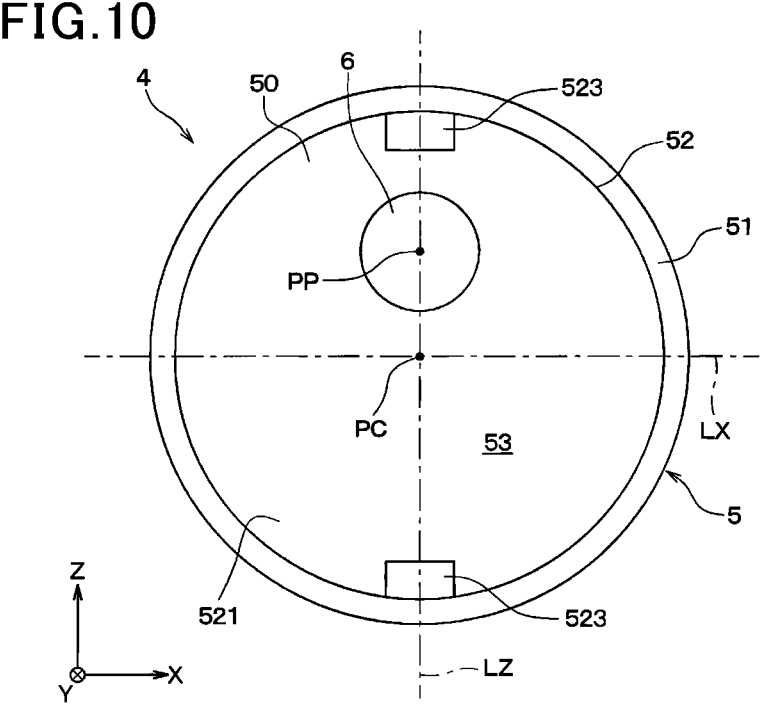
FIG. 10 is a bottom view of the ultrasonic transducer shown in FIG. 9.

FIG. 9 and FIG. 10 are that in which a portion of the configuration of the transducer case 5 in the ultrasonic transducer 4 shown in FIG. 3 and FIG. 4 is modified.

The transducer case 5 shown in FIG. 9 and FIG. 10 has the protruding portion 523. The protruding portion 523 is provided in the side plate portion 51 so as to protrude towards the interior space 53 side. Specifically, in the transducer case 5 shown in FIG. 9 and FIG. 10, a pair of protruding portions 523 are arranged so as to be symmetrical across the center axis DA. As a result of this configuration, generation of the second vibration mode can be favorably promoted.

Here, the shape of the protruding portion 523 can be set as appropriate based on at least one of the resonance frequency f2 and the difference between the resonance frequency f1 and the resonance frequency f2. In addition, the protruding portions 523 are preferably arranged on the straight line that passes through the center position PC and the element center PP, that is, the vertical line LZ. Consequently, a favorable vibration state in the second vibration mode such as that shown in FIG. 6B can be actualized. Furthermore, the protruding portions 523 that are provided in the side plate portion 51 in the present configuration example and the protruding portion 523 that is provided in the bottom plate portion 52 in the above-described third configuration example can be used together.

Fifth Configuration Example

Figure 11:
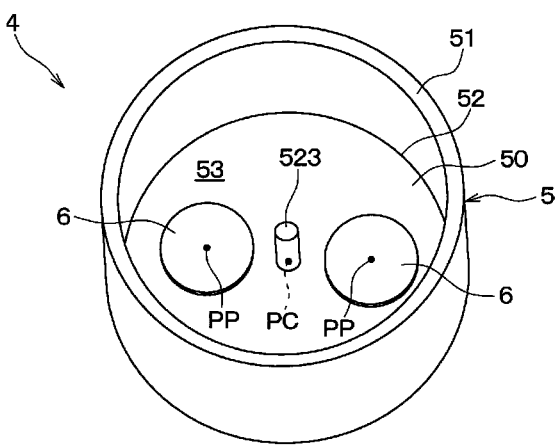
FIG. 11 is a perspective view of a fifth configuration example of the ultrasonic transducer shown in FIG. 2.
Figure 12:
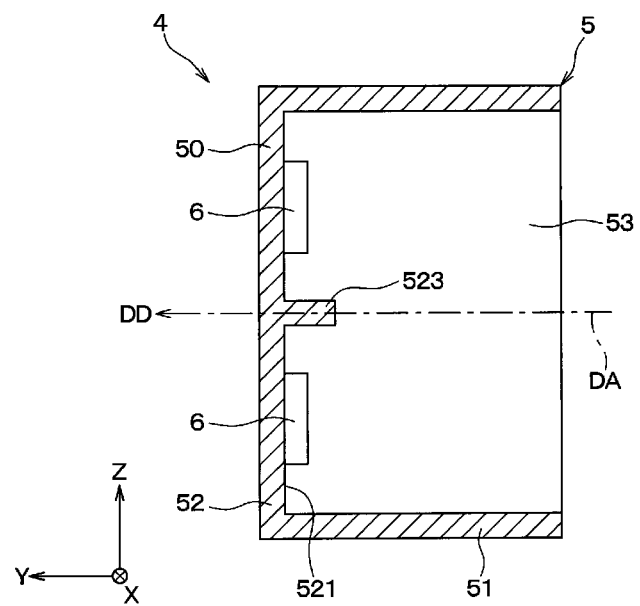
FIG. 12 is a cross-sectional view of the ultrasonic transducer shown in FIG. 11.

FIG. 11 and FIG. 12 are that in which a portion of the configuration of the ultrasonic transducer 4 shown in FIG. 3 and FIG. 4 is modified.

In the ultrasonic transducer 4 shown in FIG. 11 and FIG. 12, a pair of ultrasonic elements 6 is provided in the diaphragm 50 so as to be symmetrical across the center position PC. That is, in the diaphragm 50, only two ultrasonic elements 6 are attached in positions that differ from the center position PC. Each ultrasonic element 6 of the pair is arranged in an anti-nodal position in the second vibration mode.

In the ultrasonic transducer 4 shown in FIG. 11 and FIG. 12, a drive timing of the pair of ultrasonic transducers 4 can be switched between in-phase and antiphase. "In-phase" refers to a phase difference between a first element drive voltage that is an alternating-current voltage at a predetermined frequency that is applied to one of the pair of ultrasonic elements 6 and a second element drive voltage that is an alternating-current voltage at a same frequency as the first element drive voltage that is applied to the other being essentially zero. In contrast, "antiphase" refers to the above-described phase difference amounting to a half period of a period that corresponds to the above-described predetermined frequency. This switching is performed by the control circuit element 25 shown in FIG. 2.

Figure 13:
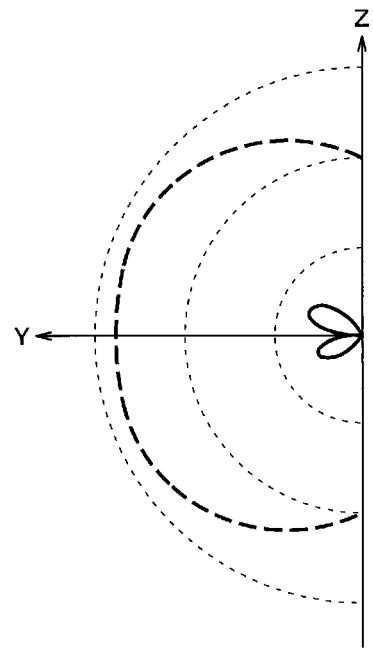
FIG. 13 is a diagram illustrating directivity characteristics when a pair of ultrasonic elements provided in the ultrasonic transducer shown in FIG. 11 and FIG. 12 are driven in phase.
Figure 14:
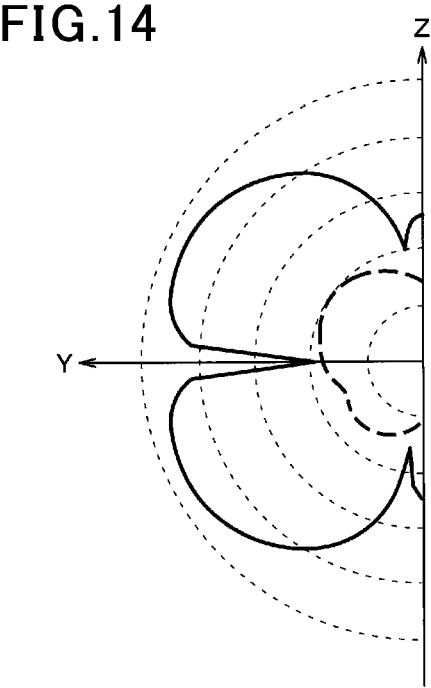
FIG. 14 is a diagram illustrating directivity characteristics when the pair of ultrasonic elements provided in the ultrasonic transducer shown in FIG. 11 and FIG. 12 are driven in antiphase (reversed phase or opposite phase)

FIG. 13 shows the directivity characteristics when the pair of ultrasonic elements 6 is driven at the in-phase drive timing at a drive frequency f1. FIG. 14 shows the directivity characteristics when the pair of ultrasonic elements 6 is driven at the antiphase drive timing at a drive frequency f2. In FIG. 13 and FIG. 14, a broken line shows the directivity characteristics that correspond to the first vibration mode, and a solid line shows the directivity characteristics that correspond to the second vibration mode.

As shown in FIG. 13, during in-phase drive, while vibrations in the first vibration mode are favorably excited, vibrations in the second vibration mode are hardly excited. In contrast, as shown in FIG. 14, during antiphase drive, while the vibrations in the second vibration mode are favorably excited, vibrations in the first vibration mode are extremely small. Here, as a result of each ultrasonic element 6 of the pair being arranged in an anti-nodal position in the second vibration mode, vibration strength in the second vibration mode, that is, transmission sound pressure of the second transmission wave can be improved.

In this manner, as a result of the ultrasonic transducer 4 of the present configuration example and the ultrasonic sensor 1 that includes the ultrasonic transducer 4, switching between the first transmission wave and the second transmission wave that have differing directivity characteristics from each other can be favorably performed. In particular, as shown in FIG. 13 and FIG. 14, a strength ratio, that is, a signal-to-noise (S/N) ratio between the first vibration mode and the second vibration mode under same drive conditions can be maximized. Here, during reception as well, through use of a first composite signal that is an in-phase composite of respective reception signals of the pair of ultrasonic elements 6 and a second composite signal that is an antiphase composite thereof, isolation between the two frequencies (that is, f1 and f2) can be improved.

In FIG. 11 and FIG. 12, the transducer case 5 has the protruding portion 523. Specifically, in the diaphragm 50, a single protruding portion 523 is provided in the center position PC. As a result, excitation in the second vibration mode is promoted. However, from a perspective of achieving effects resulting from switching between in-phase drive and antiphase drive such as that described above, the protruding portion 523 can be omitted.

Sixth Configuration Example

Figure 15:
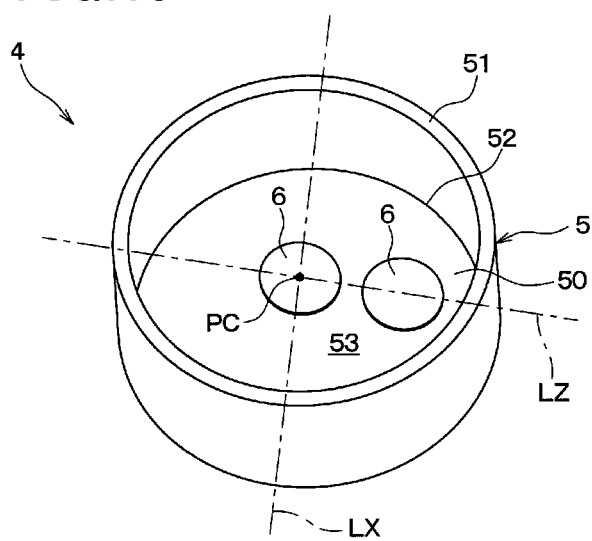
FIG. 15 is a perspective view of a sixth configuration example of the ultrasonic transducer shown in FIG. 2.
Figure 16:
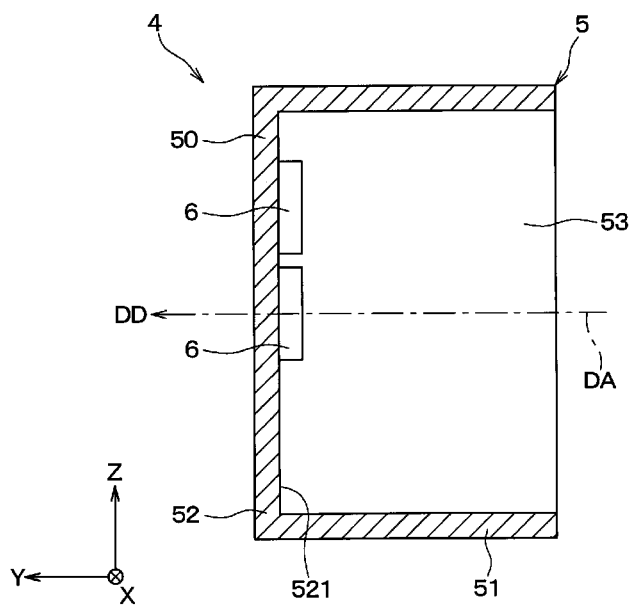
FIG. 16 is a cross-sectional view of the ultrasonic transducer shown in FIG. 15.

FIG. 15 and FIG. 16 are that in which a portion of the configuration of the ultrasonic transducer 4 shown in FIG. 3 and FIG. 4 is modified. In the ultrasonic transducer 4 shown in FIG. 15 and FIG. 16, only a single ultrasonic element 6 is provided in the center position PC in the diaphragm 50. The ultrasonic element 6 is arranged such that the element center PP coincides with the center position PC. In addition, only a single ultrasonic element 6 is provided in a position that differs from the center position PC in the diaphragm 50.

In the ultrasonic transducer 4 shown in FIG. 15 and FIG. 16, two types of drive modes, below, are possible:
(i) first drive mode: of the pair of ultrasonic elements 6, the ultrasonic element 6 that is provided in the center position PC is driven and the other ultrasonic element 6 that is provided in a position other than the center position PC is non-driven; and
(ii) second drive mode: of the pair of ultrasonic elements 6, the ultrasonic element 6 that is provided in the center position PC is non-driven and the other ultrasonic element 6 that is provided in a position other than the center position PC is driven.

As a result of the first drive mode, the first transmission wave can be generated. Meanwhile, as a result of the second drive mode, the second transmission wave can be generated. Switching between the first drive mode and the second drive mode is performed by the control circuit element 25 shown in FIG. 2.

Figure 17:
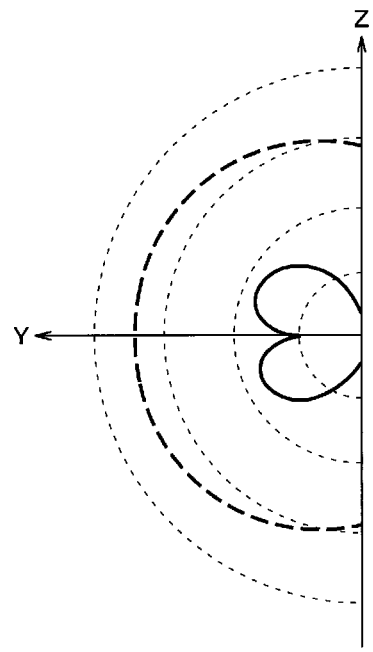
FIG. 17 is a diagram illustrating directivity characteristics of the ultrasonic transducer shown in FIG. 15 and FIG. 16.
Figure 18:
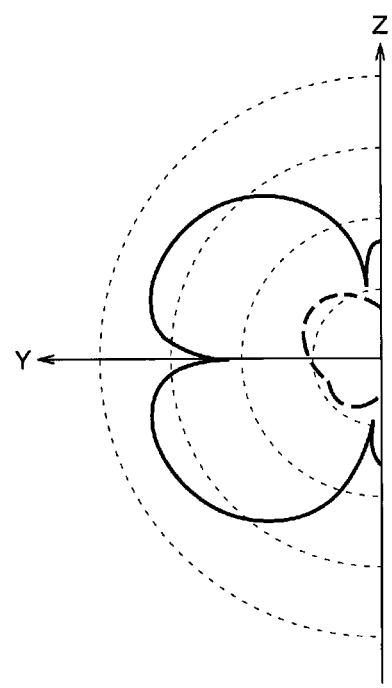
FIG. 18 is a diagram illustrating directivity characteristics of the ultrasonic transducer shown in FIG. 15 and FIG. 16.

FIG. 17 shows the directivity characteristics when the ultrasonic transducer 4 is driven in the first drive mode at the drive frequency f1. FIG. 18 shows the directivity characteristics when the ultrasonic transducer 4 is driven in the second drive mode at the drive frequency f2. In FIG. 17 and FIG. 18, a broken line shows the directivity characteristics that correspond to the first vibration mode and a solid line shows the directivity characteristics that correspond to the second vibration mode. As shown in FIG. 17 and FIG. 18, in the present configuration example as well, effects similar to those of the configuration example shown in FIG. 11 and FIG. 12 can be achieved. Here, in the present configuration example as well, the protrusions 523 in at least one of the above-described third and fourth configuration examples can be provided.

Second Embodiment: Object Detection Apparatus

Figure 19:
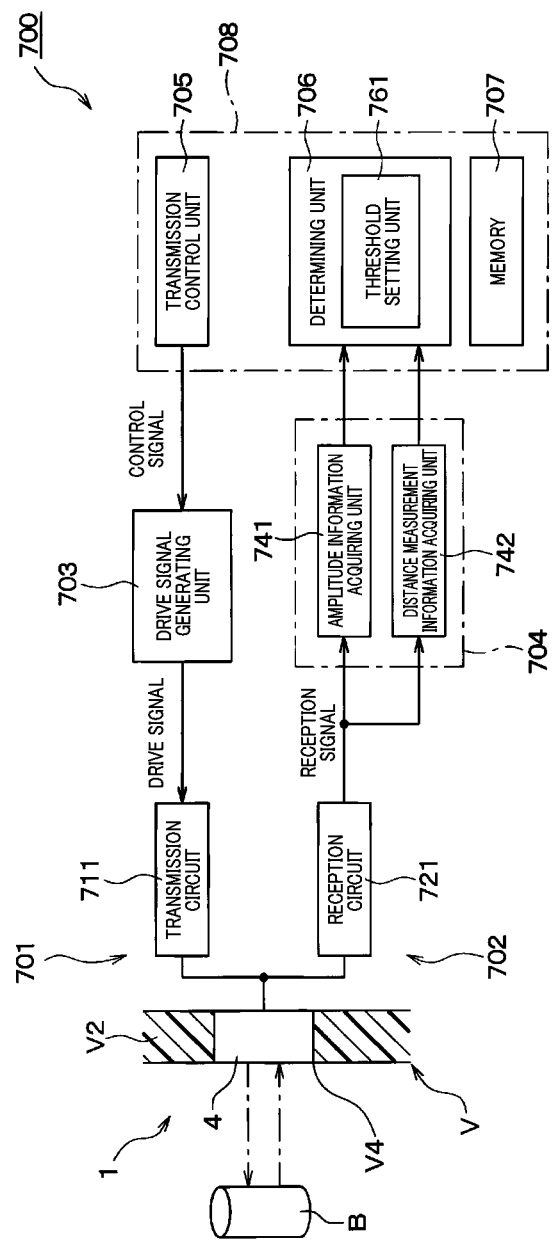
FIG. 19 is a block diagram illustrating an overall configuration of an object detection apparatus according to a second embodiment.
Figure 20:
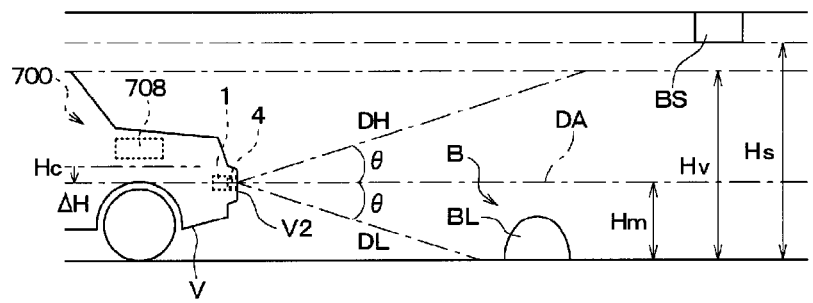
FIG. 20 is a conceptual diagram illustrating an operation overview of the object detection apparatus shown in FIG. 19.

FIG. 19 shows an overall configuration of an object detection apparatus 700 that uses the ultrasonic transducer 4 according to the above-described first embodiment. FIG. 20 shows an aspect during an object detection operation of the vehicle V, that is, the own vehicle in which the object detection apparatus 700 is mounted. The object detection apparatus 700 is configured to detect an object B that is present in the vicinity of the own vehicle in which the ultrasonic sensor 1, that is, the ultrasonic transducer 4 is mounted. Details of the configuration of the object detection apparatus 700 according to the present embodiment will be described below with reference to FIG. 19 and the like.

The object detection apparatus 700 includes a transmitting unit 701, a receiving unit 702, a drive signal generating unit 703, a reception signal processing unit 704, a transmission control unit 705, a determining unit 706, and a memory 707. According to the present embodiment, the transmitting unit 701, the receiving unit 702, the drive signal generating unit 703, and the reception signal processing unit 704 are provided in the ultrasonic sensor 1, that is, the control circuit element 25 shown in FIG. 2. Meanwhile, the transmission control unit 705, the determining unit 706, and the memory 707 are provided in an object detection ECU 708.

The transmitting unit 701 is provided so as to be capable of transmitting a transmission wave towards the outside. The receiving unit 702 is provided so as to be capable of receiving a reception wave that includes a reflected wave from the object B of the transmission wave that is transmitted from the transmitting unit 701.

According to the present embodiment, the ultrasonic sensor 1 has an integrated transmission/reception-type configuration. In other words, the ultrasonic sensor 1 is configured to provide a transmission/reception function through the ultrasonic transducer 4 by including a single ultrasonic transducer 4.

That is, the transmitting unit 701 has the ultrasonic transducer 4 and a transmission circuit 711. The transmission circuit 711 is configured to make the ultrasonic transducer 4 transmit a transmission wave at a frequency that corresponds to a frequency of a drive signal by driving the ultrasonic transducer 4 based on the inputted drive signal. Specifically, the transmitting circuit 711 has a digital/analog conversion circuit, a boosting circuit, and the like.

In addition, the receiving unit 702 has the ultrasonic transducer 4 that is shared with the transmitting unit 701, and a reception circuit 721. The reception circuit 721 is configured to generate a reception signal that corresponds to a reception result of the reception wave by the ultrasonic transducer 4 and output the reception signal to the reception signal processing unit 704. Specifically, the reception circuit 721 has an amplifier circuit, a filter circuit, an analog/digital conversion circuit, and the like.

The drive signal generating unit 703 is provided to generate the drive signal based on a control signal that is received from the transmission control unit 705 and output the drive signal to the transmitting unit 701, that is, the transmission circuit 711. The drive signal is a signal for driving the transmitting unit 701, that is, the ultrasonic transducer 4 and making the ultrasonic transducer 4 transmit the transmission wave. The control signal is a signal for controlling output of the drive signal from the drive signal generating unit 703 to the transmitting unit 701.

The reception signal processing unit 704 is provided to generate information or a signal that is required for the object detection operation in the determining unit 706 by performing various types of signal processing on the reception signal that is outputted from the receiving unit 702, and output the generated information or signal to the determining unit 706. Specifically, the reception signal processing unit 704 has an amplitude information acquiring unit 741 and a distance measurement information acquiring unit 742.

The amplitude information acquiring unit 741 is provided to generate and output an amplitude signal that corresponds to an amplitude of the reception signal that is outputted from the reception circuit 721. That is, the amplitude information acquiring unit 741 acquires amplitude information that corresponds to an amplitude of the reflected wave from the object B of the transmission wave that is transmitted from the ultrasonic transducer 4. The "amplitude information" is information that corresponds to an amplitude, that is, reception strength of the reception wave that is included in the amplitude signal.

The distance measurement information acquiring unit 742 is provided to generate and output a distance measurement signal based on the reception signal when the amplitude of the reception signal exceeds a predetermined value. That is, the distance measurement information acquiring unit 742 acquires distance measurement information that corresponds to a distance between the ultrasonic transducer 4 and the object B based on TOF when the reflected wave of the transmission wave from the object B is received. TOF is an abbreviation of Time of Flight and is a required amount of time from transmission of the transmission wave to the reception of the reflected wave. TOF can also be referred to as propagation time. The "distance measurement information" is information that corresponds to the distance between the ultrasonic transducer 4 and the object B that is included in the distance measurement signal.

The transmission control unit 705 is provided to control a transmission state of the transmission wave from the transmitting unit 701 by outputting the control signal to the drive signal generating unit 703. Specifically, the transmission control unit 705 sets the drive frequency and an output timing of the drive signal that is generated and outputted by the drive signal generating unit 703, by the control signal. That is, the transmission control unit 705 controls a transmission timing and a transmission waveform of the transmission wave.

The determining unit 706 is provided to make an obstacle determination based on various types of signal processing results regarding the reception signal by the reception signal processing unit 704. The "obstacle determination" is determination that the object B of which presence is detected by the distance measurement information being acquired is an obstacle that becomes an obstacle to the advancing of the own vehicle. That is, the obstacle determination refers to the presence of an obstacle in the vicinity of the vehicle being determined.

The determining unit 706 is configured to determine the presence of an obstacle based on at least one of the distance measurement information and the amplitude information that are acquired based on the reflected wave of the second transmission wave. As described above, the second transmission wave is the transmission wave that has the second directivity characteristics that are symmetrical across the center axis DA of the ultrasonic transducer 4 in the vehicle height direction of the own vehicle and in which the sound pressure in the front direction is decreased.

According to the present embodiment, the determining unit 706 makes the obstacle determination based on a comparison result of: (i) at least one of the amplitude information and the distance measurement information; and (ii) a determination threshold that is set based on the second directivity characteristics. Specifically, the determining unit 706 has a threshold setting unit 761. The threshold setting unit 761 stores therein a determination threshold that is set based on the second directivity characteristics. Then, the threshold setting unit 761 is provided to set the determination threshold for the determination by the determining unit 706 regarding whether an obstacle is present.

The memory 707 is provided to store therein, in time series, the signal processing results from the reception signal processing unit 704 and determination results from the determining unit 706. That is, the memory 707 stores therein the amplitude information, the distance measurement information, and the determination results from the determining unit 706 in time series, in association with one another.

According to the present embodiment, the transmission control unit 705, the determining unit 706, and the memory 707 are provided as a functional configuration unit that is actualized by the object detection ECU 708. That is, the object detection ECU 708 has a configuration as a so-called sonar ECU that controls operation of the overall object detection apparatus 700. The object detection ECU 708 is connected to the ultrasonic sensor 1 so as to be capable of communicating information over an onboard local area network (LAN) that is compliant with predetermined communication standards (such as DSI3). DSI3 is an abbreviation of Distributed System Interface 3.

The object detection ECU 708 is a microcomputer that is mounted to the vehicle V, and includes a CPU, a ROM, a RAM, a non-volatile rewritable memory, an input/output interface, and the like (not shown). The CPU is an abbreviation of Central Processing Unit. ROM is an abbreviation of Read-Only Memory. RAM is an abbreviation of Random Access Memory. The non-volatile rewritable memory is a storage medium in which, while information can be rewritten while power is turned on, information is held so as not to be able to be rewritten when power is cut. For example, the non-volatile rewritable memory may be an EPROM, an EEPROM, a flash memory, or the like. EPROM is an abbreviation of Erasable Programmable Read-Only Memory. EEPROM is an abbreviation of Electrically Erasable Programmable Read-Only Memory. The ROM, the non-volatile rewritable memory, and the RAM are non-transitory computer-readable (tangible) storage media. At least one of the ROM and the non-volatile rewritable memory corresponds to a non-transitory computer-readable (tangible) storage medium that stores therein an object detection program according to the present embodiment. Hereafter, the CPU, the ROM, the RAM, and the non-volatile rewritable memory of the object detection ECU 708 are simply abbreviated to "CPU," "ROM," "RAM," and "non-volatile memory." The object detection apparatus 700 is configured to be capable of performing the object detection operation and various operations, such as notification, that accompany the object detection operation in the own vehicle by reading and running the program that is stored in the ROM or the non-volatile memory.

(Operation Overview)

Hereafter, an overview of the object detection operation by the object detection apparatus 700 according to the present embodiment, that is, an overview of an object detection method or an object detection program implemented by the object detection apparatus 700 will be described.

As shown in FIG. 20, the ultrasonic sensor 1 is mounted in the front bumper V2. In addition, according to the present embodiment, the ultrasonic sensor 1 is mounted to the own vehicle such that the center axis DA of the ultrasonic transducer 4 is offset downward by a predetermined amount ΔH from a vehicle height center Hc. That is, the ultrasonic sensor 1 is arranged such that a mounting height Hm is less than half a vehicle height Hv. The vehicle height center He is a center position of the vehicle V in the vehicle height direction. The mounting height Hm is a height of the center axis DA of the ultrasonic transducer 4 from the ground, that is, a road surface.

First Operation Example

An operation example of the object detection apparatus 700 according to the present embodiment will be described with reference to FIG. 19 to FIG. 21.

As shown by the solid line in FIG. 7, FIG. 14, or FIG. 18, the ultrasonic sensor 1 can transmit the second transmission wave that has the second directivity characteristics in which the sound pressure on the center axis DA is decreased and that are symmetrical across the center axis DA in the vehicle height direction. The second transmission wave has the maximum sound pressure in the direction at which the elevation angle from the center axis DA is ±θ. Therefore, typically, as shown in FIG. 20, the object B is detected by the second transmission wave in a direction at which the elevation angle from the center axis DA is ±0.

In a case in which the object B is a short protrusion BL, when a distance measurement distance D is less than a lower determination threshold DL shown in expression (1), below, the short protrusion BL is detected as an obstacle. Here, the distance measurement distance D is the distance measurement information converted into actual distance.

$$DL = \frac{Hm}{\sin\theta} \quad (1)$$

Meanwhile, regarding a ceiling protrusion BS, when the distance measurement distance D is less than an upper determination threshold DH shown in expression (2), below, the ceiling protrusion BS is detected as an obstacle. Alternatively, instead of the upper determination threshold DH, a ceiling determination threshold DS shown in expression (3), below, can be used. In expression (3), a design ceiling height Hs is a value that is obtained by a predetermined design allowance value being added to the vehicle height Hv.

$$DH = \frac{Hv - Hm}{\sin\theta} \quad (2)$$

$$DS = \frac{Hs - Hm}{\sin\theta} \quad (3)$$

However, the ceiling protrusion BS rarely becomes an obstacle to the advancing of the own vehicle. Even if the ceiling protrusion BS becomes an obstacle, the ceiling protrusion BS is visually apparent. Therefore, in the present operation example, when the distance measurement distance D is less than the lower determination threshold DL, the object detection ECU 708, that is, the determining unit 706 makes the obstacle determination. That is, the object detection ECU 708 determines the presence of an obstacle based on a comparison result of the distance measurement information and the lower determination threshold that is set based on the second directivity characteristics.

Figure 21:
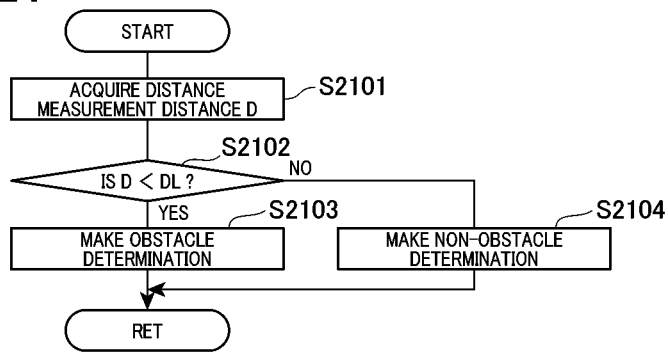
FIG. 21 is a flowchart illustrating a first operation example of the object detection apparatus shown in FIG. 19.

FIG. 21 shows a flowchart that corresponds to the present operation example. In the flowchart, "S" is an abbreviation of step. The object detection method is performed by the CPU of the object detection ECU 708 reading and running a routine (that is, the object detection program) that corresponds to the flowchart shown in FIG. 21 from the ROM or the non-volatile memory. This similarly applies to flowcharts in FIG. 22 and other drawings.

The routine shown in FIG. 21 is started by the CPU when a reception timing for the reflected wave arrives in the ultrasonic sensor 1. The reception timing is a timing after elapse of a predetermined wait time taking into consideration reverberation time, from a transmission end timing of the transmission wave. When the present routine is started, first, at step S2101, the CPU acquires the distance measurement distance D. That is, the CPU temporarily holds, in a predetermined area of the RAM, the distance measurement distance D that corresponds to newest distance measurement information that is acquired by the determining unit 706 from the distance measurement information acquiring unit 742. Next, at step S2102, the CPU determines whether the distance measurement distance D is less than the lower determination threshold DL.

When the distance measurement distance D is less than the lower determination threshold DL (that is, YES at step S2102), the CPU performs a process at step S2103 and then temporarily ends the present routine. At step S2103, the CPU makes the obstacle determination. That is, the CPU determines the presence of the short protrusion BL that becomes an obstacle to the advancing of the own vehicle.

When the distance measurement distance D is equal to or greater than the lower determination threshold DL (that is, NO at step S2102), the CPU performs a process at step S2104 and then temporarily ends the present routine. At step S2104, the CPU makes a non-obstacle determination. That is, the CPU determines absence of the short protrusion BL that becomes an obstacle to the advancing of the own vehicle.

Second Operation Example

Figure 22:
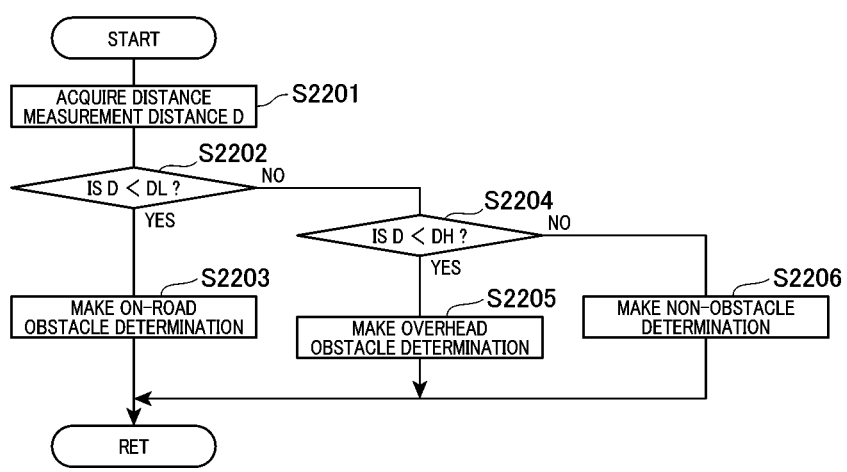
FIG. 22 is a flowchart illustrating a second operation example of the object detection apparatus shown in FIG. 19.

FIG. 22 is a flowchart that corresponds to a second operation example in which a portion of the above-described first operation example is modified. In the present operation example as well, in a manner similar to the above-described first operation example, the presence of an obstacle is determined based on a comparison result of the distance measurement information and the determination threshold that is set based on the second directivity characteristics.

Specifically, in the present operation example, when the distance measurement distance D is less than the lower determination threshold DL, the object detection ECU 708, that is, the determining unit 706 makes an on-road obstacle determination. The on-road obstacle determination is determination that a short obstacle is present on the road ahead of the own vehicle. In addition, when the distance measurement distance D is equal to or greater than the lower determination threshold DL and less than the upper determination threshold DH, the object detection ECU 708 makes an overhead obstacle determination. The overhead obstacle determination is determination that the ceiling protrusion BS that is present overhead ahead of the own vehicle is an obstacle.

That is, processing content at step S2201 in FIG. 22 is similar to processing content at step S2101 in FIG. 21. In addition, determination content at step S2202 in FIG. 22 is similar to determination content at step S2102 in FIG. 21.

When the distance measurement distance D is less than the lower determination threshold DL (that is, YES at step S2202), the CPU performs a process at step S2203 and then temporarily ends the present routine. At step S2203, the CPU makes the on-road obstacle determination. Meanwhile, when the distance measurement distance D is equal to or greater than the lower determination threshold DL (that is, NO at step S2202), the CPU advances the process to step S2204. At step S2204, the CPU determines whether the distance measurement distance D is less than the upper determination threshold DH.

When the distance measurement distance D is less than the upper determination threshold DH (that is, YES at step S2204), the CPU performs a process at step S2205 and then temporarily ends the present routine. At step S2205, the CPU makes the overhead obstacle determination.

When the distance measurement distance D is equal to or greater than the upper determination threshold DH (that is, NO at step S2204), the CPU performs a process at step S2206 and then temporarily ends the present routine. At step S2206, the CPU makes the non-obstacle determination. That is, the CPU determines the absence of the short protrusion BL and the ceiling protrusion BS that become an obstacle to the advancing of the own vehicle.

Third Operation Example

Figure 23:
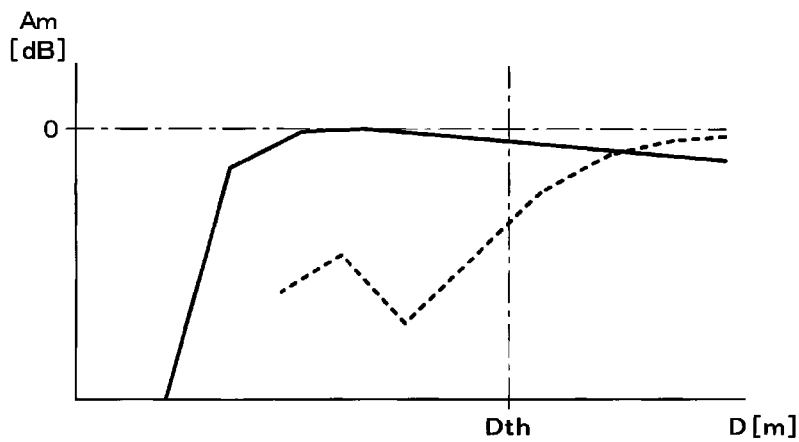
FIG. 23 is a graph illustrating an overview of a third operation example of the object detection apparatus shown in FIG. 19.

FIG. 23 shows a manner of change in an amplitude Am of the reception signal based on the reflected wave from the short protrusion BL and the ceiling protrusion BS of the second transmission wave in accompaniment with changes in the distance measurement distance D. In FIG. 23, a solid line shows the manner of change in the case of the short protrusion BL and a broken line shows the manner of change in the case of the ceiling protrusion BS.

As shown in FIG. 20, a case in which, as a result of the own vehicle traveling ahead, the own vehicle approaches the object B that is present ahead of the own vehicle is assumed. In this case, as shown in FIG. 23, at a stage in which the distance, that is, the distance measurement distance D is farther than a predetermined distance Dth, a significant difference in the amplitude Am and the manner of change thereof is difficult to find between the short protrusion BL and the ceiling protrusion BS. Meanwhile, when the distance becomes closer to the predetermined distance Dth, a significant difference in the amplitude Am and the manner of change thereof is present between the short protrusion BL and the ceiling protrusion BS. That is, regarding the short protrusion BL, the amplitude Am hardly changes even when the distance changes. In contrast, regarding the ceiling protrusion BS, an attenuation gradient of the amplitude Am as a result of the distance becoming closer is large. In addition, a significant difference is present in the amplitude Am between the short protrusion BL and the ceiling protrusion BS.

In this manner, through use of the second transmission wave that has the substantially "heart"-shaped (cardioid) directivity characteristics that are symmetrical above and below and in which the sound pressure in the front direction is attenuated, a significant difference is present in the amplitude Am and the manner of change thereof between the short protrusion BL and the ceiling protrusion BS. Therefore, the object detection ECU 708, that is, the determining unit 706 determines the presence of an obstacle based on the manner of change in the amplitude Am that corresponds to the amplitude information in accompaniment with changes in the distance measurement distance D that corresponds to the distance measurement information.

Specifically, in the present operation example, the object detection ECU 708 determines the presence of an obstacle based on a comparison result of the changes in amplitude and a determination threshold that is set based on the second directivity characteristics. More specifically, the object detection ECU 708 makes the obstacle determination when a gradient dAm/dD of the changes in the amplitude Am as a result of the changes in the distance measurement distance D when the distance measurement distance D is less than the predetermined distance Dth is less than a gradient determination threshold α.

Figure 24:
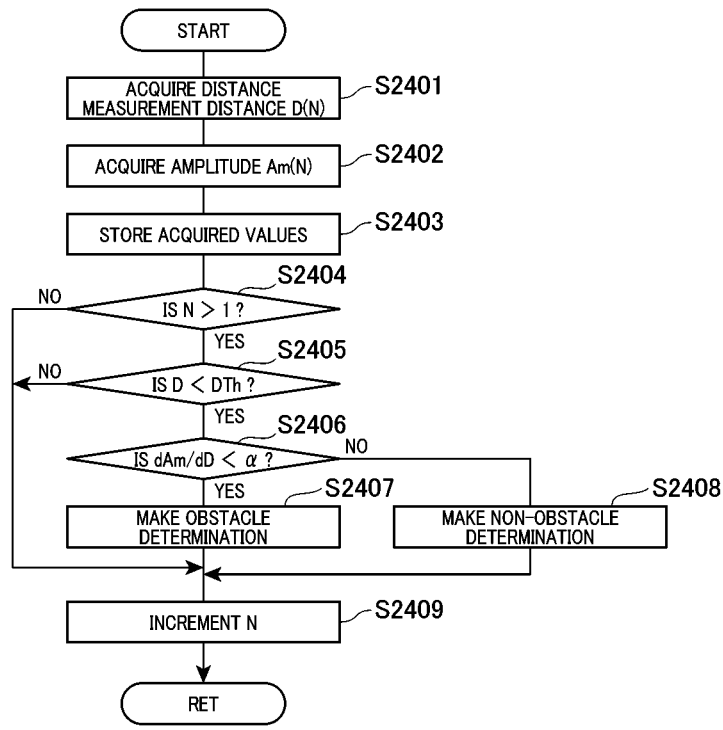
FIG. 24 is a flowchart illustrating the third operation example of the object detection apparatus shown in FIG. 19.

FIG. 24 shows a flowchart that corresponds to the present operation example. A routine shown in FIG. 24 is started by the CPU when the reception timing for the reflected wave arrives in the ultrasonic sensor 1. Here, a counter N is a counter for counting a number of consecutive startups of the present routine and is an integer of 1 or more. The counter N is reset to "1" at initial startup. "At initial startup" is when the present routine is initially started after a predetermined object detection condition is met. "At initial startup" is also when the present routine is initially started after the object detection condition is met again, in a case in which the object detection condition is no longer met after temporarily being met and the object detection condition is subsequently met again before an ignition switch of the own vehicle is turned off.

When the present routine is started, first, at step S2401, the CPU acquires a distance measurement distance D(N).

The distance measurement distance D(N) is the distance measurement distance D that is acquired when the present routine is started for an Nth time.

At step S2402, the CPU acquires an amplitude Am(N). The amplitude Am(N) is the amplitude Am that is acquired when the present routine is started for the Nth time. Next, at step S2403, the CPU stores the acquisition results at step S2401 and step S2401 in a predetermined area of the RAM or the non-volatile memory in time series (that is, in association with the counter N).

After the processes at step S2401 to step S2403, the CPU performs a process at step S2404. At step S2404, the CPU determines whether the counter N exceeds 1.

When the counter N is 1 (that is, NO at step S2404), changes in the amplitude Am that accompany the changes in the distance measurement distance D cannot be calculated. Therefore, in this case, the CPU skips processes at step S2405 to step S2408. After incrementing a value of the counter N at step S2409, the CPU temporarily ends the present routine. In contrast, when the counter N exceeds 1 (that is, YES at step S2404), the CPU advances the process to step S2405.

At step S2405, the CPU determines whether the distance measurement distance D is less than the predetermined distance Dth. When the distance measurement distance D is equal to or greater than the predetermined distance Dth (that is, NO at step S2405), the CPU skips the processes at step S2406 to step S2408. After incrementing the value of the counter N at step S2409, the CPU temporarily ends the present routine. In contrast, when the distance measurement distance D is less than the predetermined distance Dth (that is, YES at step S2405), the CPU advances the process to step S2406. At step S2406, the CPU determines whether the gradient dAm/dD exceeds the gradient determination threshold $\alpha$.

When the gradient dAm/dD is less than the gradient determination threshold $\alpha$ (that is, YES at step S2406), the CPU advances the process to step S2407. At step S2407, the CPU makes the obstacle determination. That is, the CPU determines the presence of the short protrusion BL that becomes an obstacle to the advancing of the own vehicle.

When the gradient dAm/dD is equal to or greater than the gradient determination threshold $\alpha$ (that is, NO at step S2406), the CPU advances the process to step S2408. At step S2408, the CPU makes the non-obstacle determination. That is, the CPU determines the absence of the short protrusion BL that becomes an obstacle to the advancing of the own vehicle.

After execution of the process at step S2407 or step S2408, the CPU performs a process at step S2409 and temporarily ends the present routine. At step S2409, the CPU increments the value of the counter N. That is, the CPU adds 1 to the value of the counter N.

Fourth Operation Example

Figure 25:
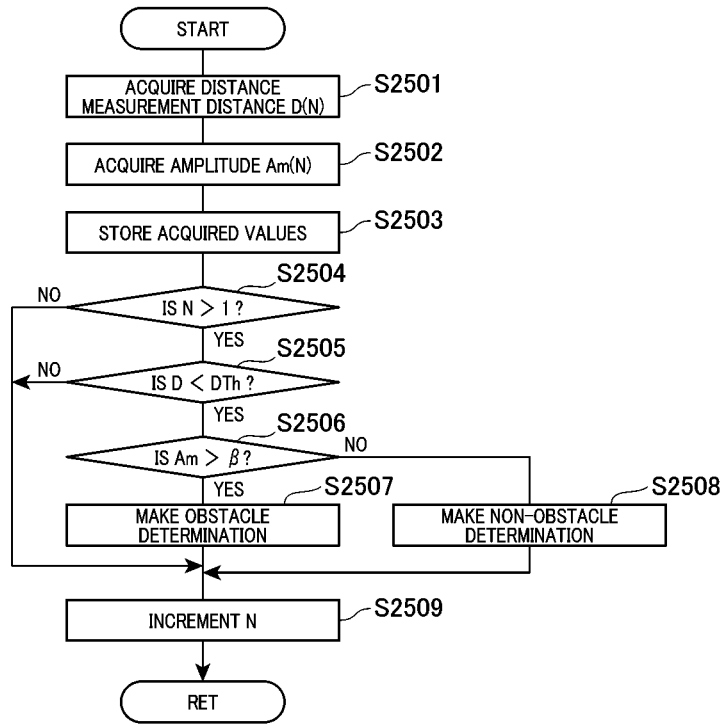
FIG. 25 is a flowchart illustrating a fourth operation example of the object detection apparatus shown in FIG. 19.

FIG. 25 is a flowchart that corresponds to a fourth operation example in which a portion of the above-described third operation example is modified. In the present operation example as well, in a manner similar to the above-described third operation example, the presence of an obstacle is determined based on the manner of change in the amplitude Am that corresponds to the amplitude information in accompaniment with changes in the distance measurement distance D that corresponds to the distance measurement information.

Specifically, in the present operation example, the object detection ECU 708 determines the presence of an obstacle based on the comparison result of the amplitude Am and an amplitude determination threshold $\beta$ that is set based on the second directivity characteristics. More specifically, the object detection ECU 708 makes the obstacle determination when the amplitude Am exceeds the amplitude determination threshold $\beta$ in a state in which the distance measurement distance D is less than the predetermined distance D.

That is, processing content at step S2501 to step S2505 in FIG. 25 is respectively similar to processing content at step S2401 to step S2405 in FIG. 24. At step S2506, the CPU determines whether the amplitude Am exceeds the amplitude determination threshold $\beta$.

When the amplitude Am exceeds the amplitude determination threshold $\beta$ (that is, YES at step S2506), the CPU advances the process to step S2507. At step S2507, the CPU makes the obstacle determination.

When the amplitude Am is equal to or less than the amplitude determination threshold $\beta$ (that is, NO at step S2506), the CPU advances the process to step S2508. At step S2508, the CPU makes the non-obstacle determination.

After execution of the process at step S2507 or step S2508, the CPU performs a process at step S2509 and then temporarily ends the present routine. Processing content at step S2509 is similar to processing content at step S2409.

Fifth Operation Example

The ultrasonic sensor 1 or the object detection apparatus 700 can be mounted to the vehicle V of a plurality of vehicle types. In this regard, as is clear from FIG. 20, expression (1), and the like, determination thresholds, such as the lower determination threshold DL, are set based on a mounting condition in the onboard state of the ultrasonic sensor 1, that is, the ultrasonic transducer 4.

Here, a manufacturer of the ultrasonic sensor 1 or the object detection apparatus 700 and a manufacturer of the vehicle V may differ. Therefore, the ultrasonic sensor 1 or the object detection apparatus 700 may be so-called "retrofitted," that is, attached to the vehicle V after a possessor of the vehicle V changes from the manufacturer to a third party (that is, a dealer, a repair shop, a user, or the like).

In addition, in the vehicle V that is possessed by the user, the mounting condition may change. Specifically, for example, the vehicle height Hv may change as a result of the vehicle V being legally modified. Alternatively, for example, the vehicle V may be provided with a so-called vehicle height adjustment mechanism.

Figure 26:
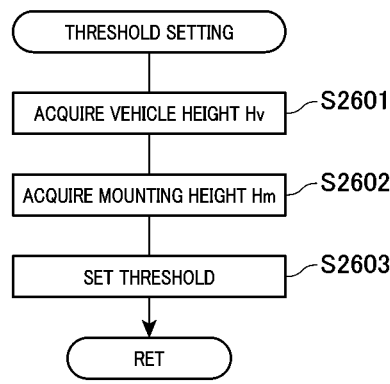
FIG. 26 is a flowchart illustrating a fifth operation example of the object detection apparatus shown in FIG. 19.

Therefore, in the present operation example, the object detection ECU 708, that is, the determining unit 706 changes the determination threshold based on changes in the mounting condition of the ultrasonic transducer 4 in the vehicle V. FIG. 26 is a flowchart of an overview of an operation for setting or changing the determination threshold.

A threshold setting routine shown in FIG. 26 is performed at a predetermined timing. For example, the "predetermined timing" may be when a predetermined operation is performed by the manufacturer or the dealer of the vehicle V or at a repair shop. Alternatively, for example, the "predetermined timing" may be a point in time at which the ignition switch of the vehicle V is turned on or a predetermined point in time between the point in time at which the ignition switch of the vehicle V is turned on and the object detection condition being initially met. Alternatively, for example, the "predetermined timing" may be when a vehicle height adjustment operation by the vehicle height adjustment mechanism (such as an air suspension mechanism) provided in the vehicle V is completed.

When the threshold setting routine shown in FIG. 26 is started, first, at step S2601, the CPU acquires a current vehicle height Hv. For example, the vehicle height Hv may be acquired by input from a worker, reception of vehicle height setting information from an ECU that controls the vehicle height adjustment mechanism, or the like.

Next, at step S2602, the CPU acquires a current mounting height Hm. For example, the mounting height Hm can be acquired by input from a worker. Alternatively, for example, the mounting height can be calculated from the vehicle height Hv acquired at step S2601.

Next at step S2603, the CPU sets the determination threshold based on the acquired vehicle height Hv and mounting height Hm. For example, the determination threshold can be set using a table or a map that is generated based on experiments or computer simulation, of which at least one of the vehicle height Hv and the mounting height Hm is used as a parameter. When the process at step S2603 is ended, the CPU temporarily ends the present routine.

Sixth Operation Example

The present operation example is an operation example in which a presence of an on-road obstacle is determined using the first transmission wave and the second transmission wave. For example, this operation example may be effective in a parking assistance situation. Specifically, for example, when the own vehicle is advancing towards a parking space, a wheel stop may be present in an end portion of the parking space on an advancing destination side and a wall may be present further towards the advancing destination side than the wheel stop. In this case, even when a wheel of the vehicle comes into contact with the wheel stop and parking is completed, the wall does not collide with the own vehicle. Therefore, this wall is not an obstacle.

As a result of the first transmission wave that has the spindle-shaped directivity characteristics in which the front direction is the center, the reflected waves are received from both the wheel stop and the wall. At this time, an elevation angle position of the wheel stop is significantly shifted from the front direction at which sound pressure is maximum. Therefore, reflected wave strength from the wheel stop is low. In contrast, as a result of the second transmission wave that has the substantially "heart"-shaped (cardioid) directivity characteristics that are symmetrical above and below and in which the sound pressure in the front direction is attenuated, the reflected wave from the wheel stop is mainly received. At this time, the wheel stop is positioned near the direction of the elevation angle θ from the center axis DA at which the sound pressure is maximum. Therefore, the reflected wave strength from the wheel stop is higher than that of the first transmission wave.

Therefore, in the present operation example, the object detection ECU 708, that is, the determining unit 706 determines the presence of an obstacle based on an amplitude that corresponds to the reflected wave of the first transmission wave and an amplitude that corresponds to the reflected wave of the second transmission wave. Specifically, the object detection ECU 708 compares an amplitude Am1 that corresponds to the reflected wave of the first transmission wave and an amplitude Am2 that corresponds to the reflected wave of the second transmission wave of which the distance measurement distance D is substantially the same. Then, when Am1<Am2, the object detection ECU 708 makes the obstacle determination with the detected object B being the short protrusion BL, such as the wheel stop.

Figure 27:
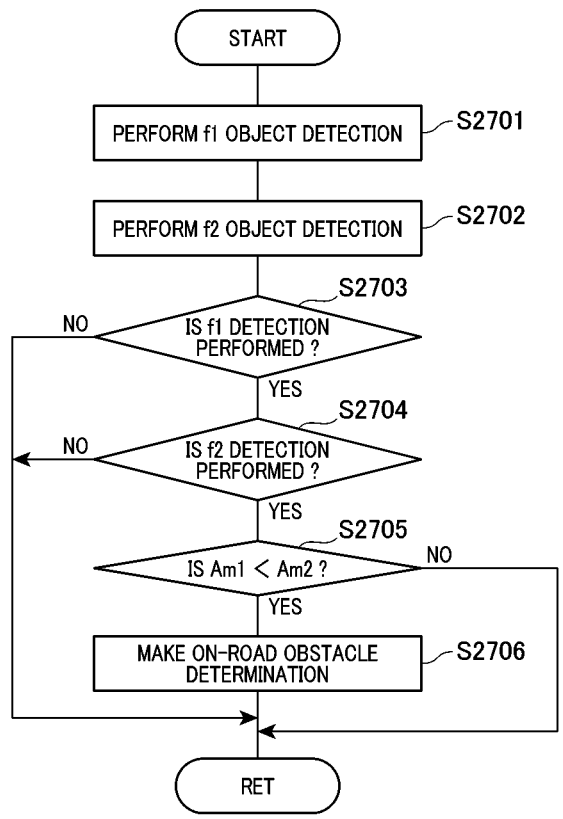
FIG. 27 is a flowchart illustrating a sixth operation example of the object detection apparatus shown in FIG. 19.

FIG. 27 shows a flowchart that corresponds to the present operation example. A routine shown in FIG. 27 is repeatedly started by the CPU at a predetermined time interval from when the object detection condition is met.

When the present routine is started, first, at step S2701, the CPU acquires an object detection result by the first transmission wave at the transmission frequency f1. Next, at step S2702, the CPU acquires the object detection result by the second transmission wave at the transmission frequency f2. Then, the CPU advances the process to step S2703.

At step S2703, the CPU determines whether the object B is detected by the first transmission wave. When object detection by the first transmission wave is not performed (that is, NO at step S2703), the CPU skips all processes at step S2704 and subsequent steps, and temporarily ends the present routine. In contrast, when the object B is detected by the first transmission wave (that is, YES at step S2703), the CPU advances the process to step S2704.

At step S2704, the CPU determines whether the object B is detected by the second transmission wave. When object detection by the second transmission wave is not performed (that is, NO at step S2704), the CPU skips all processes at step S2705 and subsequent steps, and temporarily ends the present routine. In contrast, when the object B is detected by the second transmission wave (that is, YES at step S2704), the CPU advances the process to step S2705.

At step S2705, the CPU compares the amplitude Am1 that corresponds to the reflected wave of the first transmission wave and the amplitude Am2 that corresponds to the reflected wave of the second transmission wave of which the distance measurement distance D is substantially the same. When Am1<Am2 (that is, YES at step S2705), the CPU performs the process at 2706 and then temporarily ends the present routine. At step S2706, the CPU makes the road obstacle determination. In contrast, when Am1<Am2 is not established (that is, NO at step S2705), the CPU skips the process at step S2706 and temporarily ends the present routine.

Third Embodiment

According to the second embodiment described above, the object detection operation using the transmission/reception result from a single ultrasonic sensor 1 is described. However, as shown in FIG. 1, a plurality of ultrasonic sensors 1 can be mounted to the vehicle V. Specifically, each of the plurality (such as three or four) ultrasonic sensors 1 can be mounted to the front bumper V2 in a position that differ from others in the vehicle width direction. This similarly applies to the rear bumper V3.

Figure 28:
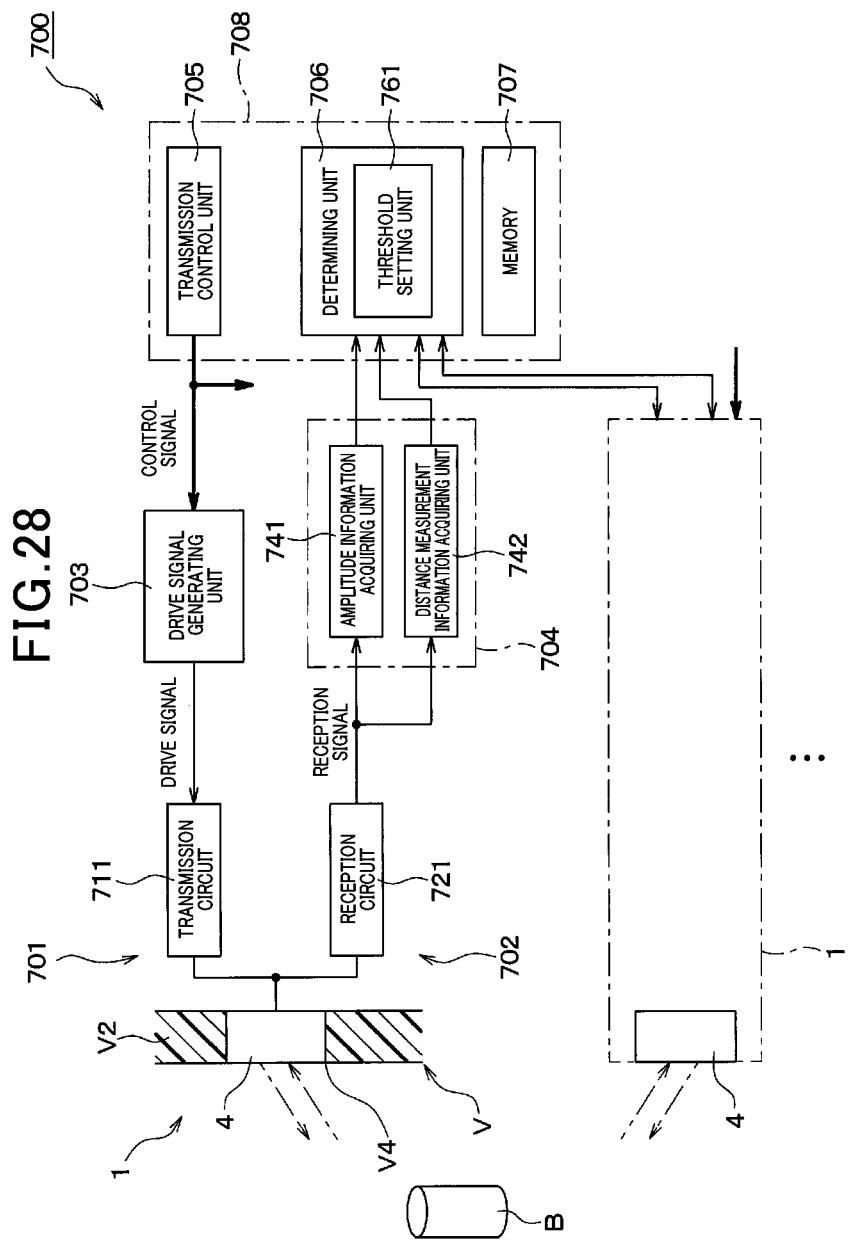
FIG. 28 is a block diagram illustrating an overall configuration of an object detection apparatus according to a third embodiment.

FIG. 28 shows a system configuration of the object detection apparatus 700 that is capable of detecting the object B ahead of the own vehicle by being provided with a plurality of ultrasonic sensors 1 that are mounted in the front bumper V2. In the object detection apparatus 700 that has this configuration, determination accuracy is improved by the respective detection results of the plurality of ultrasonic sensors 1 being integrated. Therefore, according to the present embodiment, the object detection ECU 708, that is, the determining unit 706 determines presence of an obstacle ahead of the own vehicle in a following manner.

That is, the determining unit 706 acquires a presence determination result regarding an obstacle that is based on a reflected wave that corresponds to a transmission wave that is transmitted from a first ultrasonic transducer 4. In addition, the determining unit 706 acquires a presence determination result regarding an obstacle that is based on a reflected wave that corresponds to a transmission wave that is transmitted from a second ultrasonic transducer 4. The "first ultrasonic transducer 4" is provided in a first ultrasonic sensor 1 that is one of the plurality of ultrasonic sensors 1 that are mounted in the front bumper V2. The "second ultrasonic transducer 4" is provided in a second ultrasonic sensor 1 that is another of the plurality of ultrasonic sensors 1 that are mounted in the front bumper V2. The first ultrasonic sensor 1 and the second ultrasonic sensor 1 are two ultrasonic sensors 1 that are adjacent to each other among the plurality of ultrasonic sensors 1 that are arrayed in the vehicle width direction while being mounted in the front bumper V2. Then, the determining unit 706 determines the presence of an obstacle ahead of the own vehicle based on the detection result from the first ultrasonic sensor 1 and the detection result from the second ultrasonic sensor 1.

Figure 29:
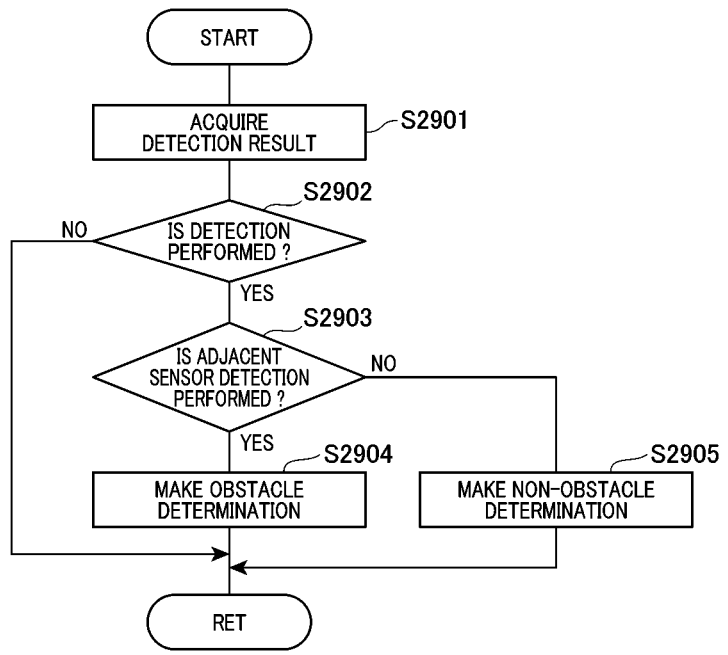
FIG. 29 is a flowchart illustrating an operation example of the object detection apparatus shown in FIG. 28.

FIG. 29 shows a flowchart that corresponds to the present embodiment. A routine shown in FIG. 29 is repeatedly started by the CPU at a predetermined time interval from when the object detection condition is met.

When the present routine is started, first, at step S2901, the CPU acquires the object detection result from each of the plurality of ultrasonic sensors 1 that are mounted in the front bumper V2. Next, at step S2902, the CPU determines whether an obstacle is detected by at least one of the ultrasonic sensors 1.

When an obstacle is not detected by each of the plurality of ultrasonic sensors 1 (that is, NO at step S2902), the CPU skips all processes at step S2903 and subsequent steps, and temporarily ends the present routine. In contrast, when an obstacle is detected by at least one of the plurality of ultrasonic sensors 1 (that is, YES at step S2902), the CPU advances the process to step S2903. At step S2903, the CPU determines whether the same obstacle is detected by two adjacent ultrasonic sensors 1.

When the same obstacle is detected by the two adjacent ultrasonic sensors 1 (that is, YES at step S2903), the CPU performs the process at step S2904 and then temporarily ends the present routine. At step S2904, the CPU makes the obstacle determination.

When the same obstacle is not detected by the two adjacent ultrasonic sensors 1 (that is, NO at step S2903), the CPU performs the process at step S2905 and then temporarily ends the present routine. At step S2905, the CPU makes the non-obstacle determination.

Fourth Embodiment

According to the third embodiment, the mounting height Hm is substantially the same in each of the plurality of ultrasonic sensors 1 that are mounted in the front bumper V2. In this case, a same determination threshold is used as the determination threshold that corresponds to each of the plurality of ultrasonic sensors 1. This also similarly applies to the plurality of ultrasonic sensors 1 that are mounted in the rear bumper V3. However, as shown in FIG. 30, the mounting height Hm may not be substantially the same in the plurality of ultrasonic sensors 1 that are mounted in the front bumper V2.

Figure 30:
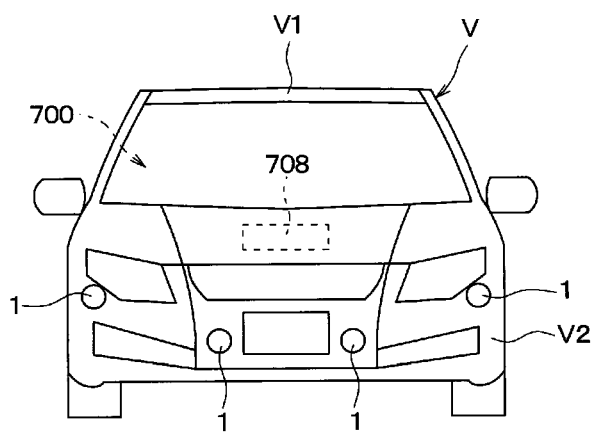
FIG. 30 is a front view of an outer appearance of a vehicle in which an object detection apparatus according to a fourth embodiment is mounted.

Specifically, in an example shown in FIG. 30, four ultrasonic sensors 1 are mounted in the front bumper V2. Between the ultrasonic sensor 1 on a right end in the drawing and the ultrasonic sensor 1 adjacent thereto, mounting positions in the vehicle height direction of the ultrasonic transducers 4 differ. In a similar manner, between the ultrasonic sensor 1 on a left end in the drawing and the ultrasonic sensor 1 adjacent thereto, the mounting positions in the vehicle height direction of the ultrasonic transducers 4 differ. Here, regarding the ultrasonic sensor 1 on the right end in the drawing and the ultrasonic sensor 1 on the left end in the drawing, the mounting position in the vehicle height direction of the ultrasonic transducer 4 may be the same. This similarly applies to the second ultrasonic sensor 1 from the right end in the drawing and the second ultrasonic sensor 1 from the left end in the drawing.

In this case, regarding the ultrasonic sensors 1 of which the mounting conditions, that is, the mounting heights Hm differ from each other, determination thresholds that differ from each other are used. As a result of the detection results of the plurality of ultrasonic sensors 1 of which the determination thresholds differ as a result of the mounting conditions differing being integrated, determination accuracy is further improved.

(Modifications)

The present disclosure is not limited to the above-described embodiments. Therefore, various modifications to the above-described embodiment are possible. Hereafter, typical modifications will be described. In the descriptions of the modifications below, differences with the above-described embodiment will mainly be described. In addition, sections according to the above-described embodiment and in the modifications that are identical or equivalent are given the same reference numbers. Therefore, in the description of the modifications below, the description according to the above-described embodiment may be applied as appropriate regarding constituent elements that have the same reference number as those according to the above-described embodiment, unless technical inconsistencies or special additional descriptions are present.

The ultrasonic sensor 1 is not limited to that for onboard use. That is, the ultrasonic sensor 1 can be used for various purposes other than an onboard clearance sonar or corner sonar.

The ultrasonic sensor 1 is not limited to the configuration that is capable of transmitting/receiving ultrasonic waves. That is, for example, the ultrasonic sensor 1 may have a configuration that is capable of only transmission of ultrasonic waves. In other words, the ultrasonic transducer 4 may be for transmission and reception or for transmission.

The configurations of sections in the ultrasonic transducer 4 are also not limited to the above-described specific examples. Specifically, for example, the outer shape of the ultrasonic transducer 4, that is, the transducer case 5 is not limited to the substantially circular columnar shape and may be a substantially equilateral hexagonal columnar shape, a substantially equilateral octagonal columnar shape, or the like. In addition, the material forming the transducer case 5 may be a non-metal, or may be composite material of metal and non-metal.

The planar shape of the diaphragm 50 is also not especially limited. That is, for example, when the diaphragm 50 is formed into an oval shape, the oval shape may be a rounded-corner rectangular shape, that is, a shape that is a combination of a pair of semicircles that are separated from each other in the long direction and a rectangle therebetween, or an elliptical shape. In addition, the planar shape of the diaphragm 50 is not limited to the oval shape. Specifically, for example, the planar shape of the diaphragm 50 may be a circular shape, an equilateral polygonal shape, a dumbbell shape, or the like.

The side plate portion 51 and the bottom plate portion 52 may not be seamlessly integrally formed. That is, for example, the bottom plate portion 52 may be joined to one end of the cylindrical side plate portion 51 by various types of joining techniques such as welding, bonding, and the like. In this case, the side plate portion 51 may be formed by a material differing from that of the bottom plate portion 52.

The ultrasonic element 6 is not limited to the piezoelectric element. That is, for example as the ultrasonic element 6, a so-called capacitance-type element can be used. The planar shape of the ultrasonic element 6 is also not limited to the substantially circular shape or the substantially elliptical shape. Specifically, the ultrasonic element 6 may be formed into a planar shape (such as an analogue) that is similar to the planar shape of the diaphragm 50.

In the object detection apparatus 700, a case in which the ultrasonic transducers 4 for transmission and the ultrasonic transducers 4 for reception are separately provided is possible. In this case, the ultrasonic transducers 4 for transmission are electrically connected to the transmission circuit 711. Meanwhile, the ultrasonic transducers 4 for reception are electrically connected to the reception circuit 721. In this case, at least the ultrasonic transducers 4 for transmission may have the configuration described according to the above-described first embodiment. That is, the ultrasonic transducer 4 for reception may have a conventional configuration. However, from the perspective of detection accuracy, the ultrasonic transducers 4 for transmission and the ultrasonic transducer 4 for reception both having the configuration described according to the above-described first embodiment is preferable.

In which of the ultrasonic sensor 1 and the object detection ECU 708 the elements that configure the object detection apparatus 700 are provided can also be changed as appropriate from the above-described specific examples. That is, for example, at least one of the drive signal generating unit 703 and the reception signal processing unit 704 can be provided in the object detection ECU 708. Alternatively, as according to the third embodiment, the plurality of ultrasonic sensors 1 and the object detection ECU 708 may be line-connected so as to be capable of communicating information therebetween, and the detection results of the plurality of ultrasonic sensors 1 may be integrated. In this case, of the functions of the determining unit 706, a function for integrating the detection results from the plurality of ultrasonic sensors 1 may be provided in the object detection ECU 708 and at least a portion of the other functions may be provided in the ultrasonic sensor 1.

The onboard LAN communication standard that is applied to the line connection between the ultrasonic sensor 1 and the object detection ECU 708 is not limited to DSI. For example, Safe-by-Wire, PSI5, CAN (registered trademark), and the like can be used. PSI5 is an abbreviation of Peripheral Sensor Interface 5. CAN (registered trademark) is an abbreviation of Controller Area Network.

All or a portion of the object detection ECU 708 may be a configuration that includes a digital circuit, such as ASIC or FPGA, that is configured to be capable of operations such as those described above. ASIC is an abbreviation of Application Specific Integrated Circuit. FPGA is an abbreviation of Field Programmable Gate Array. That is, in the object detection ECU 708, a microcomputer portion and a digital circuit portion can coexist.

A program related to the present disclosure that enables the various operations, steps, or processes described according to the above-described embodiments to be performed can be downloaded or upgraded through V2X communication. V2X is an abbreviation of Vehicle to X. Alternatively, the program can be downloaded or upgraded through a terminal apparatus that is provided in a manufacturing plant of the vehicle V, a repair shop, a dealership, or the like. A storage destination of the program may be a memory card, an optical disc, a magnetic disk, or the like.

In this manner, the above-described functional configurations and methods may be actualized by a dedicated computer that is provided so as to be configured by a processor and a memory, the processor being programmed to provide one or a plurality of functions that are realized by a computer program. Alternatively, the above-described functional configurations and methods may be actualized by a dedicated computer that is provided by a processor being configured by a single dedicated hardware logic circuit or more. Still alternatively, the above-described functional configurations and methods may be actualized by a single dedicated computer or more. The dedicated computer may be configured by a combination of a processor that is programmed to provide one or a plurality of functions, a memory, and a processor that is configured by a single hardware logic circuit or more. In addition, the computer program may be stored in a non-transitory computer-readable (tangible) storage medium that can be read by a computer as instructions implemented by the computer. That is, the above-described functional configurations and methods can also be expressed as a computer program that includes steps (processes) for actualizing the functional configurations and methods, or a non-transitory computer-readable (tangible) storage medium in which the program is stored.

When the ceiling determination threshold DS is used instead of the upper determination threshold DH, the offset of the mounting height Hm from the vehicle height center He may be $\Delta H = 0$.

In many cases, the ultrasonic sensor 1 is mounted in the bumper. In many cases, the bumper is mounted below the vehicle height center Hc. Therefore, the offset direction of the mounting height Hm from the vehicle height center He is ordinarily downward. In the specific examples described above with reference to FIG. 20, accuracy of obstacle detection, particularly differentiation in the up/down direction, is achieved through use of structural characteristics such as this.

However, in a broadest sense, the present disclosure is not limited to this aspect. That is, for example, the ultrasonic sensor 1 may be mounted on a body panel that configures the vehicle body 1. In this case, the offset direction of the mounting height Hm from the vehicle height center He may be upward. Alternatively, the offset amount may be $\Delta H = 0$. In such cases as well, the above-described embodiments can be applied as long as technical inconsistencies are not present.

The present disclosure is not limited to the specific operation examples described according to the above-described embodiments. Specifically, for example, according to the above-described embodiments, for simplification of the description, an example of obstacle detection ahead of the own vehicle using the ultrasonic sensor 1 that is mounted in the front bumper V2 is mainly described. However, the present disclosure is not limited to this aspect. That is, for example, object detection to the rear of the own vehicle using the ultrasonic sensor 1 that is mounted to the rear bumper V3 can also be performed in a manner similar to that according to the above-described embodiments. This also similarly applies to obstacle detection to the side of the own vehicle using the ultrasonic sensor 1 that is mounted to a side surface of the vehicle body V1.

Processes in the above-described operation examples can also be modified as appropriate. That is, for example, in the above-described specific examples, determination using the distance measurement distance D may be performed. However, the present disclosure is not limited to this aspect. That is, the above-described operation examples can be actualized without the distance measurement information being converted to the distance measurement distance D. Specifically, instead of the distance measurement distance D, a k-digit hexadecimal value that corresponds to the distance measurement information can be used. In this case, instead of the determination threshold (such as the lower determination threshold DL), a K-digit hexadecimal value that corresponds to the determination threshold can be used. K is, for example, 2 or 4.

According to the above-described embodiments, a mounting elevation angle of the ultrasonic transducer 4, that is, an angle formed by the center axis DA and the horizontal plane in the onboard state is substantially zero degrees. However, the present disclosure is not limited to this aspect. When the mounting elevation angle is not substantially zero degrees, an angle formed by the Z-axis direction and the vehicle height direction corresponds to the mounting elevation angle. Then, the "symmetry" across the center axis in the Z-axis direction in the second directivity characteristics is symmetry in the direction along the vehicle height direction. In addition, the mounting elevation height may be taken into consideration in the setting or changing of the determination threshold based on the mounting condition of the ultrasonic transducer 4 in the vehicle V. In this case, in the flowchart shown in FIG. 26, a step for acquiring the mounting elevation angle may be provided before the process at step S2603.

In each determining process, "less than a threshold" and "equal to or less than a threshold" are interchangeable. In a similar manner, "equal to or greater than a threshold" and "exceeds a threshold" are interchangeable. That is, the less than sign "<" at each determination step may be "<" unless technical inconsistencies are present. In a similar manner, the greater than sign ">" at each determination step may be ">" unless technical inconsistencies are present.

In the descriptions above, a plurality of constituent elements that are seamlessly integrally formed together may be formed by separate members being bonded together. In a similar manner, a plurality of constituent elements that are formed by separate members being bonded together may be seamlessly integrally formed together.

In the descriptions above, a plurality of constituent elements that are formed from the same material as each other may be formed from materials that differ from each other. In a similar manner, a plurality of constituent elements that are formed from materials that differ from each other may be formed from the same material as each other.

It goes without saying that an element that configures an above-described embodiment is not necessarily a requisite unless particularly specified as being a requisite, clearly considered a requisite in principle, or the like. In addition, in cases in which a numeric value, such as quantity, amount, or range, of a constituent element is stated, the present disclosure is not limited to the specific numeric value unless particularly specified as being a requisite, clearly limited to the specific numeric value in principle, or the like. In a similar manner, when a shape, a direction, a positional relationship, or the like of a constituent element or the like is mentioned, excluding cases in which the shape, the direction, the positional relationship, or the like is clearly described as particularly being a requisite, is clearly limited to a specific shape, direction, positional relationship, or the like in principle, or the like, the present disclosure is not limited to the shape, direction, positional relationship, or the like.

Similar expressions, such as "acquire," "calculate," "estimate," "detect," "sense," and "determine," can be mutually interchanged as appropriate as long as technical inconsistencies are not present. "Detect" or "sense," and "extract" can also be interchanged as appropriate as long as technical inconsistencies are not present.

The modifications are also not limited to the examples given above. For example, the entirety or a part of one of the plurality of configuration examples or embodiments and the entirety or a part of another may be combined as long as technical inconsistencies are not present. A number of configuration examples or embodiments to be combined is also not especially limited. In a similar manner, the entirety or a part of one of the plurality of modifications and the entirety or a part of another may be combined as long as technical inconsistencies are not present. Furthermore, the entirety or a part of one of the plurality of embodiments and the entirety or a part of another may be combined as long as technical inconsistencies are not present.

(Methods and Programs)

The present disclosure described by the above-described embodiments and modifications include each aspect below, related to the object detection method and the object detection program. Here, the aspects below can be applied in combination as long as technical inconsistencies are not present.

An object detection method is a method for detecting an object that is present in a vicinity of a vehicle (V) in which an ultrasonic transducer (4) is mounted using the ultrasonic transducer. An object detection program is a program that is implemented by an object detection apparatus (700) that is configured to detect the object that is present in the vicinity of the vehicle in which the ultrasonic transducer is mounted using the ultrasonic transducer.

The ultrasonic transducer includes: a transducer case (5) that is formed into a bottomed, cylindrical shape that has a side plate portion (51) that is formed into a cylindrical shape that surrounds a center axis (DA) and a bottom plate portion (52) that seals one end side of the side plate portion in an axial direction that is parallel to the center axis so as to configure a diaphragm (50) that is capable of ultrasonic vibration; and an ultrasonic element (6) that is fixedly supported to the bottom plate portion so as to face an interior space (53) that is surrounded by the side plate portion and the bottom plate portion, and converts between an electrical signal and ultrasonic vibrations, in which the ultrasonic element is arranged in a position that is offset in an in-plane direction that is orthogonal to the axial direction relative to a center position (PC) of the diaphragm in the in-plane direction so as to be capable of generating a first transmission wave that has first directivity characteristics and a second transmission wave that has second directivity characteristics that are directivity characteristics that differ from the first directivity characteristics and in which sound pressure in the axial direction is decreased.

According to a first aspect, processes that are performed in the object detection method and by the object detection apparatus include: an amplitude acquiring process for acquiring amplitude information that corresponds to an amplitude of a reflected wave from the object of the transmission wave that is transmitted from the ultrasonic transducer; a distance acquiring process for acquiring distance measurement information that corresponds to a distance to the object based on the reflected wave; and a determining process for determining a presence of an obstacle that is the object that is an obstacle to advancing of the vehicle based on at least one of the distance measurement information and the amplitude information that are acquired based on the reflected wave of the second transmission wave that is the transmission wave that has the second directivity characteristics that are symmetrical across the center axis in a vehicle height direction of the vehicle.

According to a second aspect, the determining process includes a process for determining the presence of the obstacle based on a manner of change in the amplitude that corresponds to the amplitude information in accompaniment with changes in the distance that corresponds to the distance measurement information.

According to a third aspect, the determining process includes a process for determining the presence of the obstacle based on a comparison result of the amplitude or changes in the amplitude, and a determination threshold that is set based on the second directivity characteristics.

According to a fourth aspect, the determining process includes a process for determining the presence of the obstacle based on a comparison result of the distance measurement information and a determination threshold that is set based on the second directivity characteristics.

According to a fifth aspect, the determining process includes a process for changing the determination threshold based on a mounting condition of the ultrasonic transducer in the vehicle.

According to a sixth aspect, the determining process includes a process for determining the presence of the obstacle based on the amplitude that corresponds to the reflected wave of the first transmission wave and the amplitude that corresponds to the reflected wave of the second transmission wave.

According to a seventh aspect, the determining process includes a process for determining the presence of the obstacle based on a presence determination result of the obstacle based on a reflected wave that corresponds to a transmission wave that is transmitted from a first ultrasonic transducer and a presence determination result of the obstacle based on a reflected wave that corresponds to a transmission wave that is transmitted from a second ultrasonic transducer.

According to an eighth aspect, the first ultrasonic transducer and the second ultrasonic transducer have differing mounting positions in the vehicle height direction.

What is claimed is:

1. An ultrasonic transducer comprising:
a transducer case that is formed into a bottomed, cylindrical shape that has a side plate portion that is formed into a cylindrical shape that surrounds a center axis and a bottom plate portion that seals one end side of the side plate portion in an axial direction that is parallel to the center axis so as to configure a diaphragm that is capable of ultrasonic vibration; and
an ultrasonic element that is fixedly supported to the bottom plate portion so as to face an interior space that is surrounded by the side plate portion and the bottom plate portion, and converts between an electrical signal and ultrasonic vibrations, wherein
the ultrasonic element is arranged in a position that is offset in an in-plane direction that is orthogonal to the axial direction relative to a center position of the diaphragm in the in-plane direction so as to be capable of generating a first transmission wave that has first directivity characteristics, and a second transmission wave that has second directivity characteristics that are directivity characteristics that differ from the first directivity characteristics and in which sound pressure in the axial direction is decreased.

2. The ultrasonic transducer according to claim 1, wherein:
the transducer case further includes a protruding portion that is provided in the side plate portion or the bottom plate portion so as to protrude towards the interior space side.

3. The ultrasonic transducer according to claim 1, wherein:
the center position is an anti-nodal position in a first vibration mode of the diaphragm that corresponds to the first directivity characteristics and a nodal position in a second vibration mode of the diaphragm that corresponds to the second directivity characteristics; and
the ultrasonic element is arranged in a position that differs from the center position in the in-plane direction.

4. The ultrasonic transducer according to claim 3, wherein:
the ultrasonic element is arranged in the anti-nodal position in the second vibration mode.

5. The ultrasonic transducer according to claim 3, wherein:
the diaphragm is formed into a planar shape of which a thickness is fixed and an oval shape that has a long direction and a short direction that are orthogonal to each other;
the side plate portion has a thin portion that is formed into a partially circular cylindrical shape that has a predetermined thickness and is provided in each of both end portions in the long direction, and a thick portion that is formed to be thicker than the thin portion and provided in each of both end portions in the short direction and; and
only a single ultrasonic element is provided in the diaphragm.

6. The ultrasonic transducer according to claim 3, wherein:
only a single ultrasonic element is provided in the center position and only a single ultrasonic element is provided in a position differing from the center position in the diaphragm.

7. The ultrasonic transducer according to claim 3, wherein:
a pair of ultrasonic elements are provided in the diaphragm so as to be symmetrical across the center position.

8. An ultrasonic sensor comprising:
the ultrasonic transducer according to claim 6; and
a control circuit element that is electrically connected to the ultrasonic transducer so as to switch between the first vibration mode and the second vibration mode, wherein
the control circuit element generates the first transmission wave by driving the ultrasonic element that is provided in the center position and not driving the ultrasonic element that is provided in the position other than the center position, and generates the second transmission wave by not driving the ultrasonic element that is provided in the center position and driving the ultrasonic element that is provided in the position other than the center position.

9. An ultrasonic sensor comprising:
the ultrasonic transducer according to claim 7; and a control circuit element that is electrically connected to the ultrasonic transducer so as to switch between the first vibration mode and the second vibration mode, wherein the control circuit element switches a drive timing of the pair of ultrasonic elements between in-phase and anti-phase.

10. An object detection apparatus that is configured to detect an object that is present in a vicinity of a vehicle in which the ultrasonic transducer according to claim 1 is mounted using the ultrasonic transducer, the object detection apparatus comprising:

an amplitude information acquiring unit that acquires amplitude information that corresponds to an amplitude of a reflected wave from the object of the transmission wave that is transmitted from the ultrasonic transducer;

a distance measurement information acquiring unit that acquires distance measurement information that corresponds to a distance to the object based on the reflected wave; and a determining unit that determines a presence of an obstacle that is the object that is an obstacle to advancing of the vehicle based on at least one of the distance measurement information and the amplitude information that are acquired based on the reflected wave of the second transmission wave that is the transmission wave that has the second directivity characteristics that are symmetrical across the center axis in a vehicle height direction of the vehicle.

11. The object detection apparatus according to claim 10, wherein:

the determining unit determines the presence of the obstacle based on a manner of change in the amplitude that corresponds to the amplitude information in accompaniment with changes in the distance that corresponds to the distance measurement information.

12. The object detection apparatus according to claim 10, wherein:

the determining unit determines the presence of the obstacle based on a comparison result of the amplitude or changes in the amplitude, and a determination threshold that is set based on the second directivity characteristics.

13. The object detection apparatus according to claim 10, wherein:

the determining unit determines the presence of the obstacle based on a comparison result of the distance measurement information and a determination threshold that is set based on the second directivity characteristics.

14. The object detection apparatus according to claim 12, wherein:

the determining unit changes the determination threshold based on a mounting condition of the ultrasonic transducer in the vehicle.

15. The object detection apparatus according to claim 10, wherein:

the determining unit determines the presence of the obstacle based on the amplitude that corresponds to the reflected wave of the first transmission wave and the amplitude that corresponds to the reflected wave of the second transmission wave.

16. The object detection apparatus according to claim 10, wherein:

the determining unit determines the presence of the obstacle based on a presence determination result of the obstacle based on a reflected wave that corresponds to a transmission wave that is transmitted from a first ultrasonic transducer and a presence determination result of the obstacle based on a reflected wave that corresponds to a transmission wave that is transmitted from a second ultrasonic transducer.

17. The object detection apparatus according to claim 16, wherein:

the first ultrasonic transducer and the second ultrasonic transducer have differing mounting positions in the vehicle height direction.

18. An object detection method for detecting an object that is present in a vicinity of a vehicle in which the ultrasonic transducer according to claim 1 is mounted using the ultrasonic transducer, the object detection method comprising:

acquiring amplitude information that corresponds to an amplitude of a reflected wave from the object of the transmission wave that is transmitted from the ultrasonic transducer;

acquiring distance measurement information that corresponds to a distance to the object based on the reflected wave; and determining a presence of an obstacle that is the object that is an obstacle to advancing of the vehicle based on at least one of the distance measurement information and the amplitude information that are acquired based on the reflected wave of the second transmission wave that is the transmission wave that has the second directivity characteristics that are symmetrical across the center axis in a vehicle height direction of the vehicle.

19. A non-transitory computer-readable storage medium storing therein an object detection program that includes processes that are implemented by an object detection apparatus that is configured to detect an object that is present in a vicinity of a vehicle in which the ultrasonic transducer according to claim 1 is mounted using the ultrasonic transducer, the processes implemented by the object detection apparatus comprising:

a process for acquiring amplitude information that corresponds to an amplitude of a reflected wave from the object of the transmission wave that is transmitted from the ultrasonic transducer;

a process for acquiring distance measurement information that corresponds to a distance to the object based on the reflected wave; and a process for determining a presence of an obstacle that is the object that is an obstacle to advancing of the vehicle based on at least one of the distance measurement information and the amplitude information that are acquired based on the reflected wave of the second transmission wave that is the transmission wave that has the second directivity characteristics that are symmetrical across the center axis in a vehicle height direction of the vehicle.

* * * * *